（12) United States Patent
Farber et al.

(10) Patent No.: US 11,044,139 B1
(45) Date of Patent: Jun. 22, 2021

(54) APPARATUSES, METHODS, AND COMPUTER PROGRAM PRODUCTS FOR DYNAMIC GENERATION AND TRAVERSAL OF OBJECT DEPENDENCY DATA STRUCTURES

(71) Applicants: Atlassian PTY Ltd., Sydney (AU); Atlassian, Inc., San Francisco, CA (US)

(72) Inventors: Jeffrey Farber, Mountain View, CA (US); Rahul Revo, San Jose, CA (US); Diogo Correa Lucas, Santa Clara, CA (US)

(73) Assignees: ATLASSIAN PTY LTD, Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/037,452

(22) Filed: Sep. 29, 2020

(51) Int. Cl.
*G06F 9/46* (2006.01)
*H04L 12/24* (2006.01)
*G06F 9/448* (2018.01)

(52) U.S. Cl.
CPC .......... *H04L 41/0233* (2013.01); *G06F 9/448* (2018.02); *G06F 9/4484* (2018.02); *G06F 9/465* (2013.01); *H04L 41/0266* (2013.01); *H04L 41/0836* (2013.01); *H04L 41/0859* (2013.01); *H04L 41/12* (2013.01)

(58) Field of Classification Search
CPC ............. H04L 41/0233; H04L 41/0836; H04L 41/0859; H04L 41/12; H04L 41/0266; H04L 41/044; H04L 43/16; H04L 65/403; H04L 67/1057; G06F 9/448; G06F 9/4484; G06F 9/465; G06F 9/4492; G06F 9/5061; G06F 16/21; G06F 16/254; G06F 3/048; H04W 8/22
See application file for complete search history.

(56) References Cited

U.S. PATENT DOCUMENTS

| | | | | |
|---|---|---|---|---|
| 2014/0321311 | A1* | 10/2014 | Groenendijk | H04L 41/12 370/252 |
| 2016/0043903 | A1* | 2/2016 | Jaisinghani | G06F 3/048 709/220 |
| 2017/0102931 | A1* | 4/2017 | Risbood | G06F 9/4492 |
| 2018/0322149 | A1* | 11/2018 | Vermeulen | G06F 16/21 |
| 2019/0109772 | A1* | 4/2019 | Lipstone | H04L 65/403 |
| 2019/0138508 | A1* | 5/2019 | Meacham | G06F 16/254 |
| 2019/0312794 | A1* | 10/2019 | Bruun | H04L 41/044 |
| 2019/0347134 | A1* | 11/2019 | Zhuo | G06F 9/5061 |
| 2020/0076701 | A1* | 3/2020 | Gershaft | H04L 41/12 |

(Continued)

*Primary Examiner* — Le H Luu
(74) *Attorney, Agent, or Firm* — Alston & Bird LLP

(57) ABSTRACT

Methods, apparatuses, or computer program products provide for generating one or more service object criticality scores for service objects based on service dependency work graph structures. A service dependency work graph structure may be retrieved from a service object repository. The service dependency work graph structure may be traversed. Based at least in part on a strength measure associated with each service object relationship of one or more service object relationships associated with each unique service object identifier, one or more service object criticality scores for the unique service object identifier may be generated in relation to each other service object identifier of the plurality of service object identifiers.

20 Claims, 13 Drawing Sheets

(56) References Cited

U.S. PATENT DOCUMENTS

2020/0228550 A1\* 7/2020 Ravindranathan ...... H04L 43/16
2020/0259711 A1\* 8/2020 Parhofer ............. H04L 67/1057
2020/0413236 A1\* 12/2020 Roeland .................. H04W 8/22

\* cited by examiner

APPARATUSES, METHODS, AND COMPUTER PROGRAM PRODUCTS FOR DYNAMIC GENERATION AND TRAVERSAL OF OBJECT DEPENDENCY DATA STRUCTURES

BACKGROUND

Various methods, apparatuses, and systems are configured to provide techniques for the discovery of service dependencies. Applicant has identified many deficiencies and problems associated with existing methods, apparatuses, and systems for tracking relationships between services and determining critical dependencies therebetween. Through applied effort, ingenuity, and innovation, these identified deficiencies and problems have been solved by developing solutions that are configured in accordance with the embodiments of the present disclosure, many examples of which are described in detail herein.

BRIEF SUMMARY

According to one aspect of the present disclosure, an apparatus is provided for generating service dependency work graph structures based on service objects, the apparatus including at least one processor and at least one memory including program code that with the processor, cause the apparatus to retrieve one or more service objects from a service object repository. In some embodiments, each service object is associated with a service object identifier and service object data including one or more service dependency objects. In some embodiments, each of the one or more service dependency objects is associated with one or more of a unique service dependency object identifier, a service dependency interface type, a service dependency data type, or a service dependency data residency type. In some embodiments, the apparatus is further caused to, for each service object, extract from each of its one or more service dependency objects any nested service dependency objects. In some embodiments, a nested service dependency object is associated with one or more of a unique nested service dependency object identifier, a respective service object identifier associated with the service object, a respective service dependency interface type associated with the service object, a respective service dependency data type associated with the service object, or a respective service dependency data residency type associated with the service object. In some embodiments, the apparatus is further caused to identify, based at least in part on the service object data, a service object relationship between each service object of the one or more service objects and every other service object of the one or more service objects. In some embodiments, the apparatus is further caused to generate, based at least in part on the service object relationship identified between each of the one or more service objects, a service dependency work graph structure interrelating the one or more service objects.

According to another aspect of the present disclosure, an apparatus is provided for generating service object criticality scores for service objects based on service dependency work graph structures, the apparatus including at least one processor and at least one memory including program code that with the processor, cause the apparatus to retrieve a service dependency work graph structure from a service object repository. In some embodiments, the service dependency work graph structure includes multiple service dependency work graph nodes connected by multiple service dependency work graph edges. In some embodiments, each service dependency work graph node is associated with a unique service object identifier of multiple service object identifiers. In some embodiments, the apparatus is further caused to, for each unique service object identifier, traverse the service dependency work graph structure. In some embodiments, the apparatus is further caused to, based at least in part on a strength measure associated with each service object relationship of one or more service object relationships associated with the unique service object identifier, generate the one or more service object criticality scores for the unique service object identifier in relation to each other service object identifier of the multiple service object identifiers.

According to another aspect of the present disclosure, an apparatus is provided for identifying limited service object identifiers based on service dependency work graph structures and service guarantees, the apparatus including at least one processor and at least one memory including program code that with the processor, cause the apparatus to retrieve, from a service object repository, one or more service object identifiers associated with a resource detection. In some embodiments, the apparatus is further caused to, for each service object identifier of the one or more service object identifiers, traverse a service dependency work graph structure. In some embodiments, the apparatus is further caused to, based at least in part on a strength measure associated with each service object relationship of one or more service object relationships associated with the service object identifier, generate one or more service object reliability scores for the service object identifier in relation to each other service object identifier of the multiple service object identifiers. In some embodiments, the apparatus is further caused to, identify those service object identifiers associated with service object reliability scores below a service guarantee threshold associated with the resource detection. In some embodiments, the apparatus is further caused to, generate, for the resource detection and based on a plurality of service object reliability scores associated with the resource detection, an aggregated service object reliability score.

According to another aspect of the present disclosure, an apparatus is provided for identifying service dependency data type conflicts associated with service object identifiers based on service dependency work graph structures and service guarantees, the apparatus including at least one processor and at least one memory including program code that with the processor, cause the apparatus to retrieve, from a service object repository, one or more service object identifiers associated with a resource detection. In some embodiments, the apparatus is further caused to, for each service object identifier of the one or more service object identifiers, traverse a service dependency work graph structure. In some embodiments, the apparatus is further caused to, based at least in part on one or more service dependency data types associated with each service object relationship of one or more service object relationships associated with the service object identifier, generate one or more service object data scores for the service object identifier in relation to each other service object identifier of the multiple service object identifiers. In some embodiments, the apparatus is further caused to, identify those service object identifiers associated with service object data scores below a service guarantee threshold associated with the resource detection.

According to another aspect of the present disclosure, an apparatus is provided for identifying service dependency data residency type conflicts associated with service object identifiers based on service dependency work graph structures and service guarantees, the apparatus including at least one processor and at least one memory including program code that with the processor, cause the apparatus to retrieve, from a service object repository, one or more service object identifiers associated with a resource detection. In some embodiments, the apparatus is further caused to, for each service object identifier of the one or more service object identifiers, traverse a service dependency work graph structure. In some embodiments, the apparatus is further caused to, based at least in part on one or more service dependency data residency types associated with each service object relationship of one or more service object relationships associated with the service object identifier, identify those service object identifiers associated with service dependency data residency types in conflict with a data residency requirement associated with the resource detection.

Various other aspects are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 5:
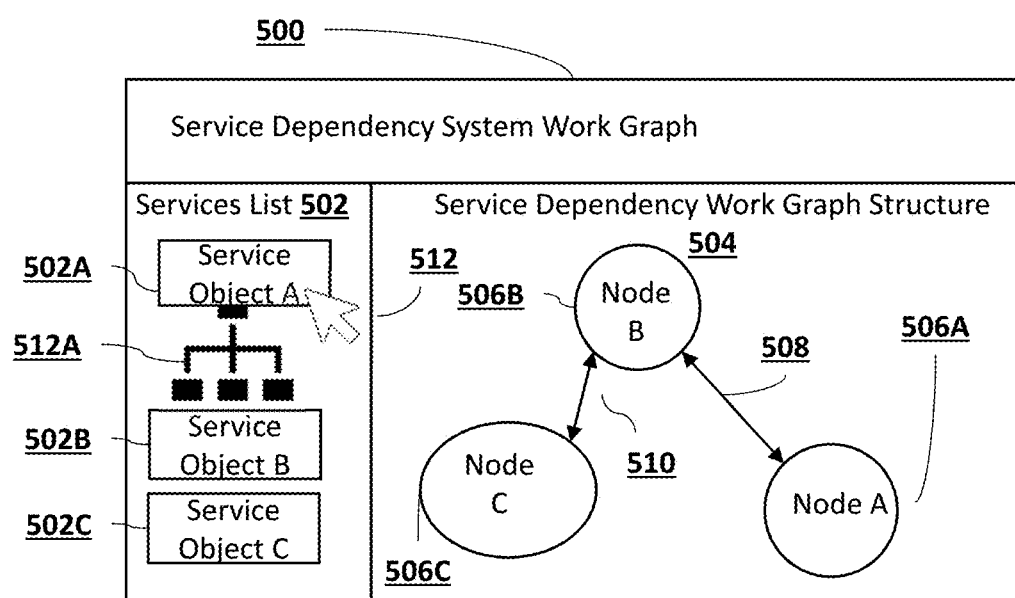

FIG. 5 provides an operational example of a service dependency work graph structure and services list in accordance with at least some embodiments of the present disclosure.

Figure 6:
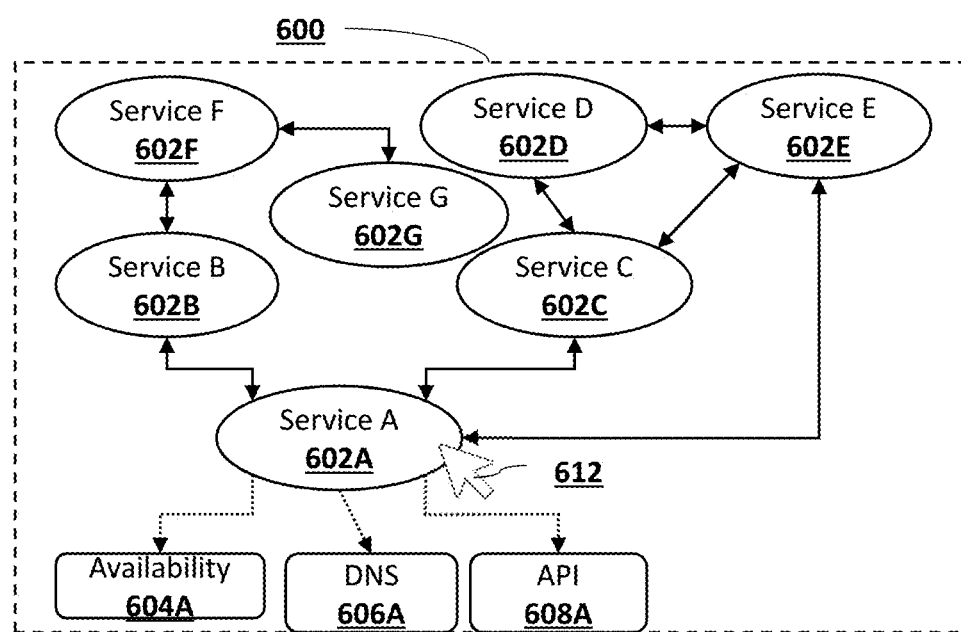

FIG. 6 provides an operational example of a service dependency work graph structure in accordance with at least some embodiments of the present disclosure.

Figure 7:
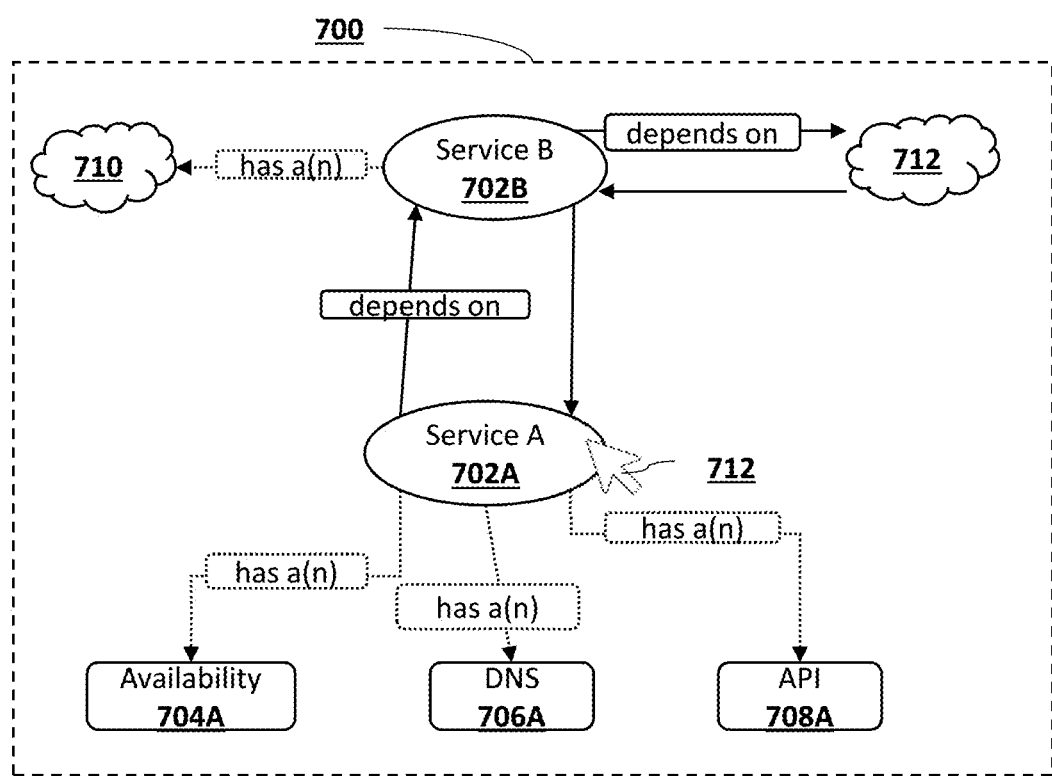

FIG. 7 provides an operational example of a service dependency work graph structure in accordance with at least some embodiments of the present disclosure.

Figure 8:
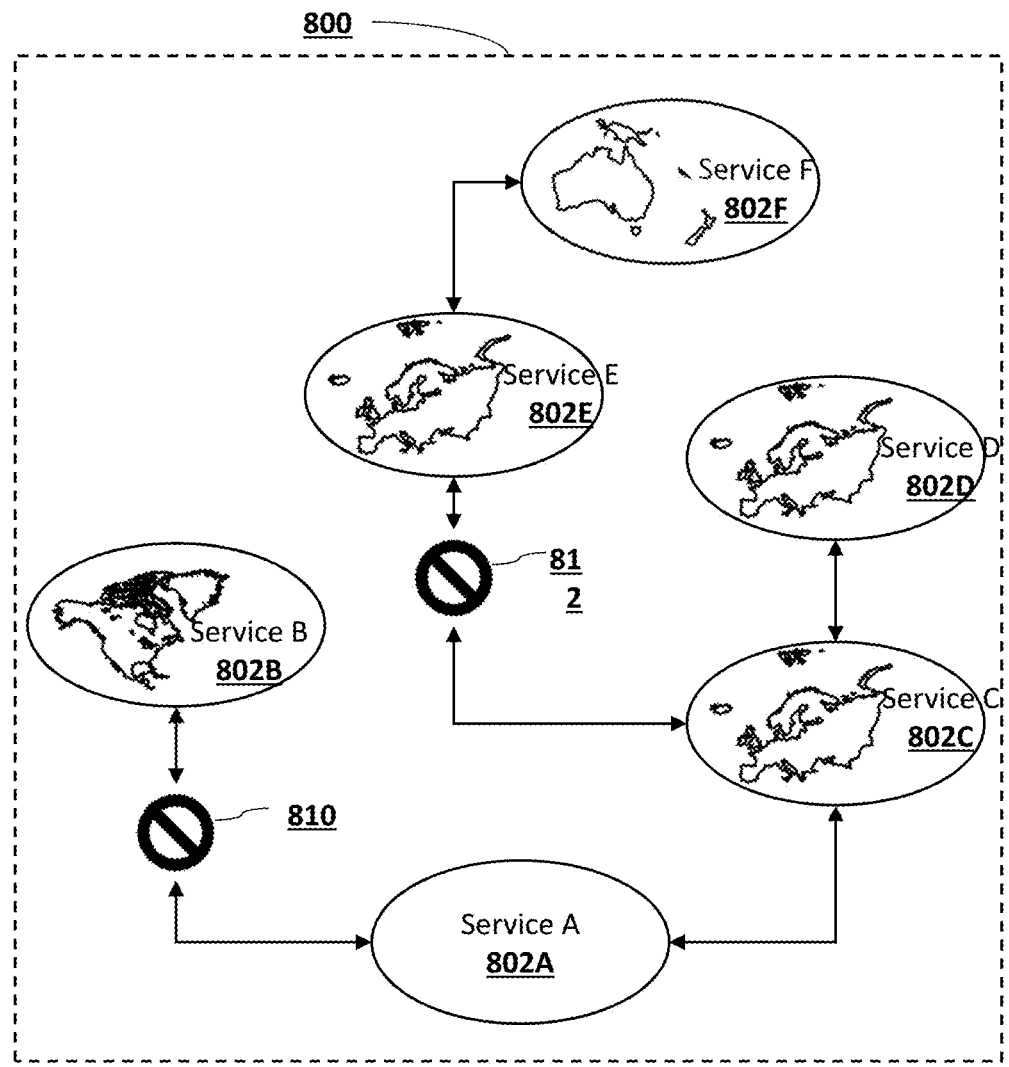

FIG. 8 is a block diagram of an example service dependent on other services in accordance with at least some embodiments of the present disclosure.

Figure 9:
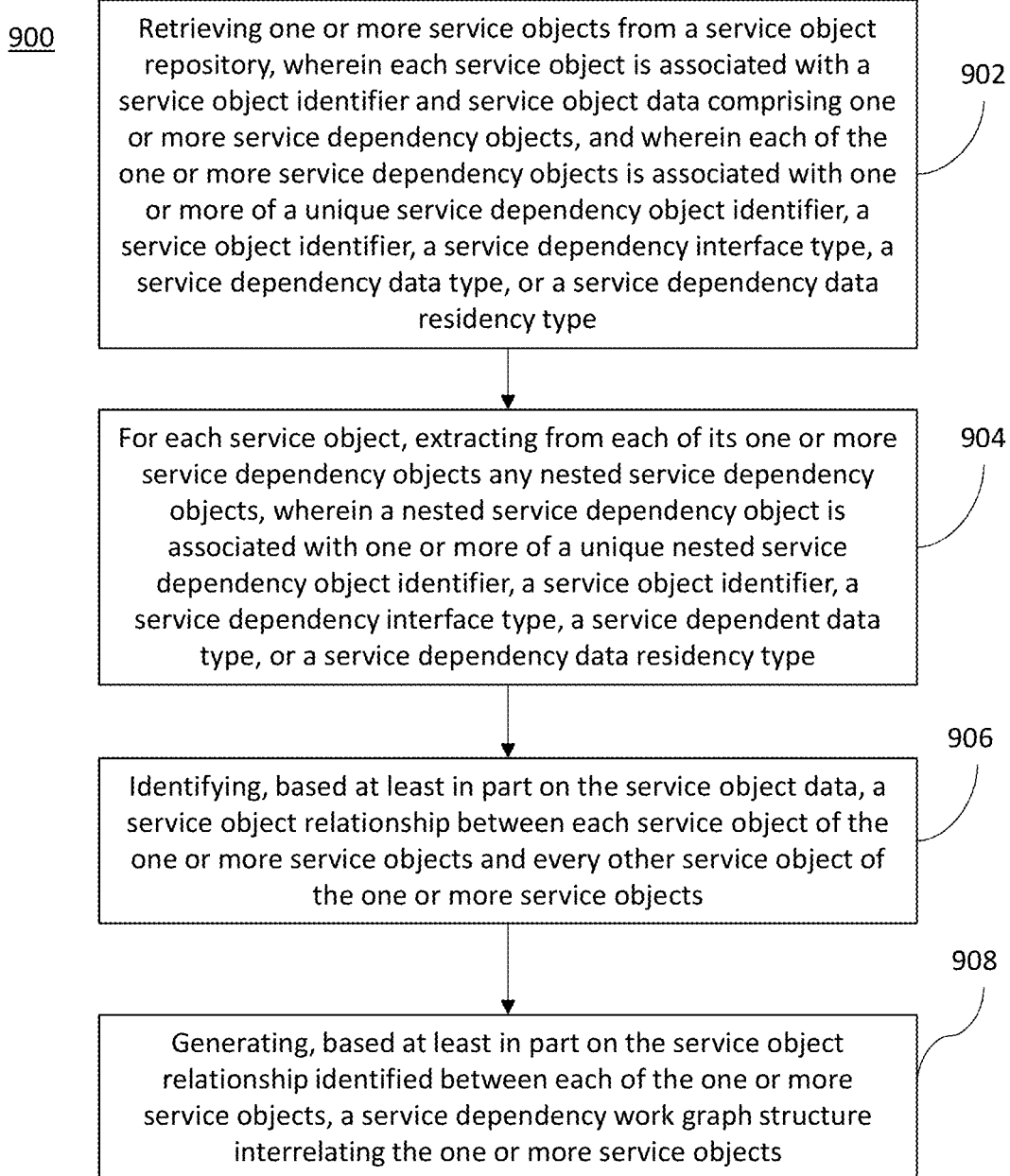

FIG. 9 is a flowchart diagram of an example service dependency system in accordance with at least some embodiments of the present disclosure.

Figure 10:
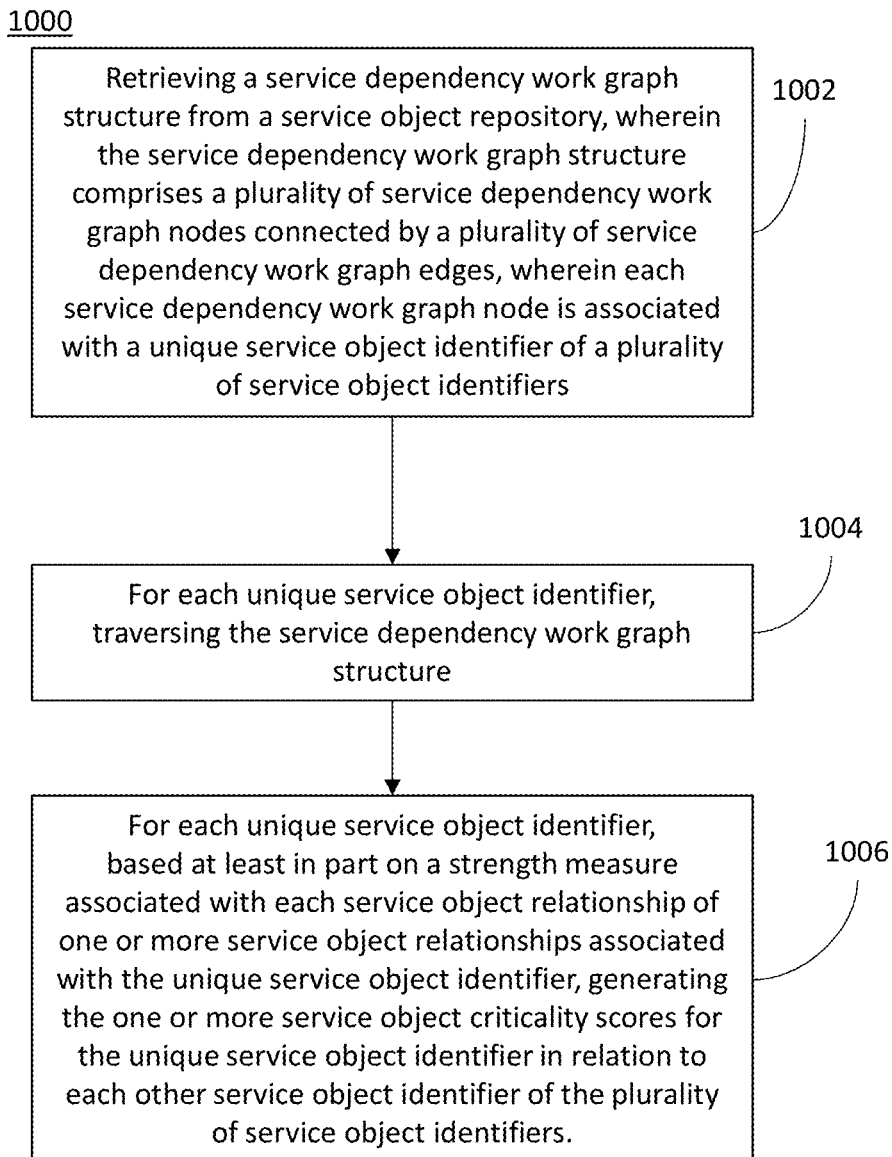

FIG. 10 is a flowchart diagram of an example service dependency system in accordance with at least some embodiments of the present disclosure.

Figure 11:
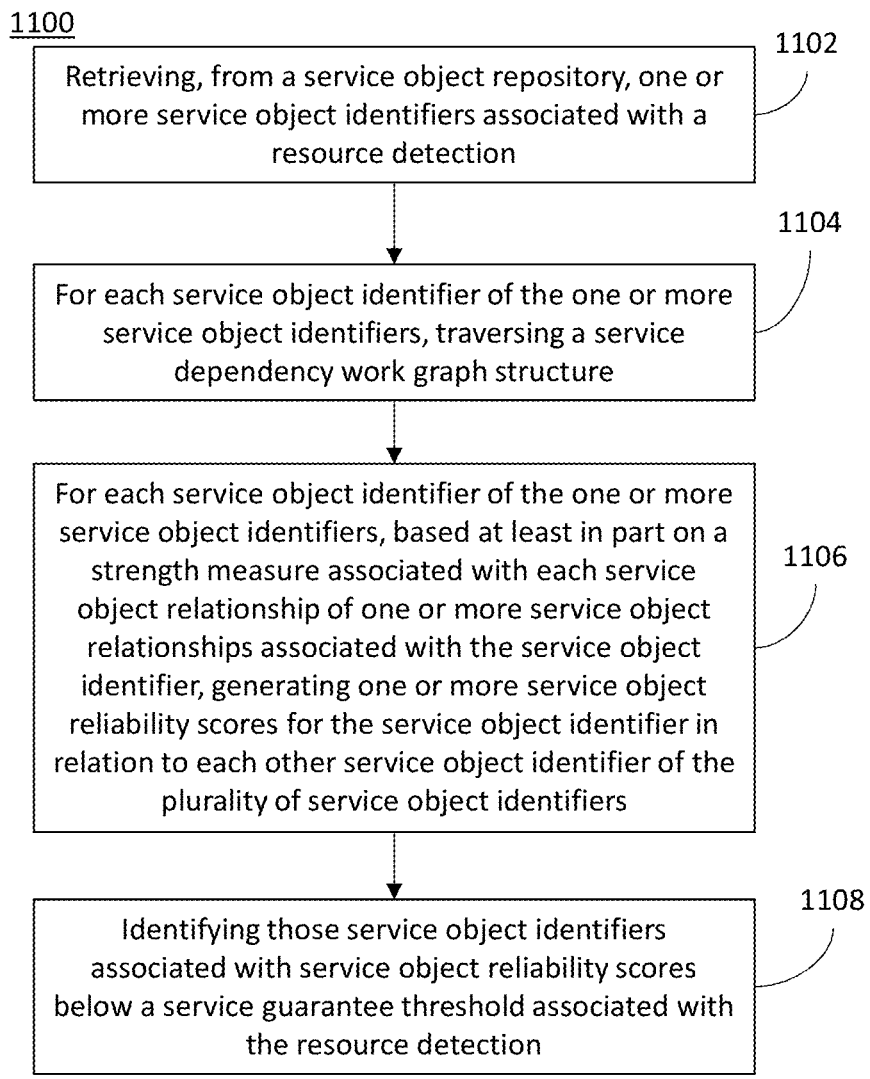

FIG. 11 is a flowchart diagram of an example service dependency system in accordance with at least some embodiments of the present disclosure.

Figure 12:
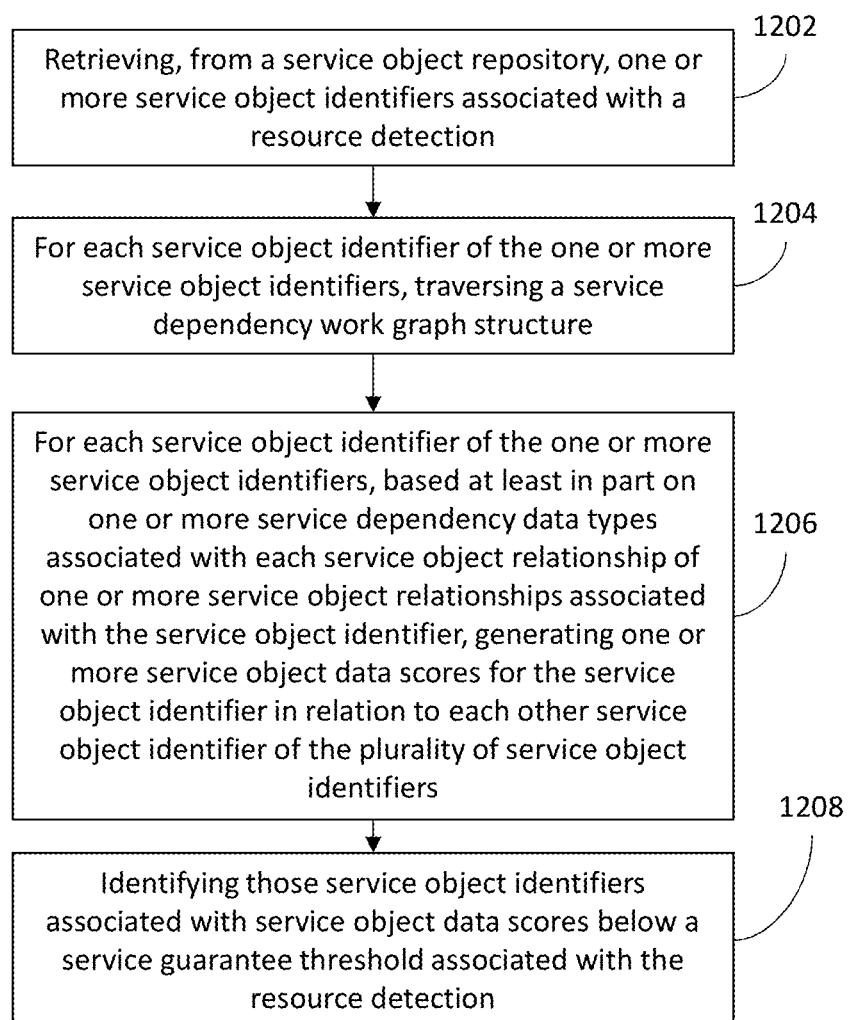

FIG. 12 is a flowchart diagram of an example service dependency system in accordance with at least some embodiments of the present disclosure.

Figure 13:
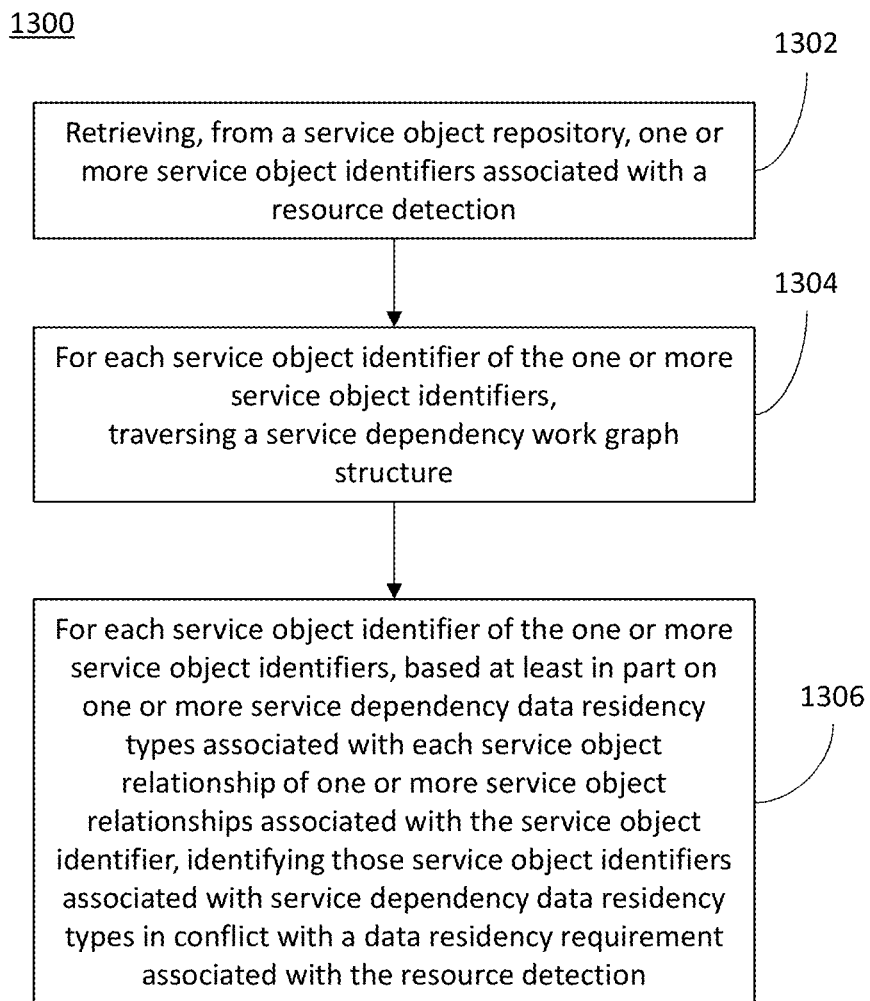

FIG. 13 is a flowchart diagram of an example service dependency system in accordance with at least some embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

The deployment of service based computing systems may involve tens of thousands or millions of interdependent automated services. When data is shared between services, the dependency relationships that are formed therebetween may need to be monitored or understood by the service owners and system architects. Monitoring of these service dependencies may be required for service reliability, scalability, security, regulation compliance, or other characteristics of requirements. Without proper monitoring of service dependencies, an application can be vulnerable to services that may or may not be reliable or that may be non-conforming to particular data handling requirements set by an administrator. Moreover, because services can be dependent on additional services, a limited service or a service non-conforming to particular data handling requirements may be several relationships removed from the application of interest, thus, making monitoring and identification all the more difficult. The present embodiments provide a window into service dependencies that go beyond a direct relationship with the application of interest and further provide a mechanism by which to review, remove, and/or replace services that display undesirable characteristics.

Furthermore, with many systems engineers, architects, and service development teams distributed globally, traditional dependency deployment architectures are difficult to build and regularly maintain. Conventional processes can be time consuming to update and are plagued by inefficiencies that are associated with data entry and global team distributions. Additionally, the nature of an expanding globalized Internet means that service dependencies for individual services are constantly shifting, while alternative service options are expanding, thus making traditional deployment architectures less efficient overtime.

To address the noted shortcomings, various embodiments of the present disclosure are directed to systems that are configured for the discovery of services, the discovery of dependencies between services and/or other dependency sources (e.g., an application, etc.), and optionally presenting the discovered information via a representative work graph. Such processes provide for the retrieval, compilation, and/or presentation of service related information, in at least the form of service objects, in accordance with service dependency objects and communication activity patterns of respective services.

In embodiments, data compiled about a particular service may be used by the present embodiments, for example, to identify limited services or to audit and report compliance with data handling requirements imposed by an organization (e.g., service clients, service or application developers, governments, corporations, etc.) that uses the particular service. For example, a service or application developer may use embodiments of the present disclosure to discover information related to external services used by their application by way of a service dependency work graph structure and choose to remove non-compliant service relationships accordingly.

By utilizing the disclosed techniques for the retrieval and presentation of service related information, a developer can identify, via service dependency work graph structures, and remove service dependencies from their application that are, for example, determined to be associated with limited, or non-compliant, services when compared with their predefined criteria. Embodiments of the present disclosure can additionally receive predefined criteria for one or more services (e.g., acceptable IP address ranges, compatible APIs, etc.) and use, for example, service dependency work graph structures to flag non-compliant services. For example, the service dependency work graph structure may identify a service dependency object associated with a service object provided by a developer in a foreign geolocation. In such an example, the foreign geolocation may be identified by the service dependency work graph structure as a service dependency data residency type conflict. In response the developer may choose to identify another service object to replace the service object in conflict or to further provide the service rendered thereby as a further part of their internal services.

In some embodiments, the service dependency work graph structure may enable dynamic modification of a service supported application directly such that the application is, at least partially, re-programmed to utilize a replacement service. In some embodiments, the replacement service may be dynamically selected based on the service dependency work graph structure. For example, a plurality of duplicate services may be executing, such as via one or more respective servers, in a plurality of geolocations and the service dependency work graph structure may be utilized with one or more logic based rule sets configured to determine which geolocations are acceptable to provide services to one or more applications. In such example embodiments, the service dependency work graph structure may be consulted to reconfigure, based on one or more logic based rule sets, one or more applications to stop receiving services provided from a first geolocation and switch to a duplicate copy of the same service associated with a second geolocation.

In some embodiments, multiple instances of a service, providing similar functionality, may be deployed or instantiated according to different performance levels. For example, a first instance of a lookup service may be provided as a high performance version, while a second instance of the lookup service may be provided as a low cost version. In such an example, embodiments of the present disclosure may be configured, such as to optimize performance over cost, to assign preference to the first instance of the lookup service over the second instance of the lookup service. Some embodiments may be configured to determine one or more replacement services based on one or more of a services cost, resource usage, performance, or geolocation. In some embodiments, the service dependency work graph structure may be utilized in decisions to switch from a first service that is offline to a second replacement service that is online.

Through the dynamic discovery and presentation of service data and dependencies, embodiments of the present disclosure can reduce or eliminate service downtime, regulation related conflicts, and other inefficiencies related to traditional dependency deployment systems. Because some embodiments collect service data associated with a plurality of services that render operations for one or more other computer programs (e.g., applications), and compiles the service data into a structured format that can easily be stored in a service object repository without burdensome memory requirements.

Service objects, that provide the structured format for the collected data associated with each service, can be configured in the form of vectors or vertices (e.g., or other applicable data structure). This allows for more efficient data storage and retrieval with respect to individual services. Service objects can be structured in predefined formats identifying pertinent information for each service which also allows for comparable information to be stored in standardized positions across service objects within the repository. In some embodiments, pertinent information collected and associated with a service may comprise one or more of a name, a geolocation, an identification as an external service, an identification as an internal service, an API definition, a host name (e.g., service.prod.us-east.company.com, etc.), a data classification tag (e.g., PII, UGC, the like, or combinations thereof), or a network API flow log.

Accordingly, for example, evaluations may be performed wherein a first service object, that comprises a particular data element, is exchanged in a graph structure for a second service object, that comprises a similar data element to the first service object. Such evaluations allow for real-time assessment of costs and benefits associated with the exchange of a first service supporting a computer program (e.g., an application, another service, etc.) with a second service providing substantially similar operational activity but without compliance or reliability issues. Moreover, such evaluations using service objects to produce alternative hypothetical graph structures for particular services can be performed without the taxing computational expense and software downtime associated with actually switching through, and monitoring, a plurality of similar service providers.

Examining service relationships via work graph structures has the added advantage of being able to hold other variables constant during the exchange of service objects within the graph structure that may not be possible in real-world computational environments during the exchange of actual services. The graph structures, that can be compiled from the generated service objects, not only provide a window into hypothetical relationships between comparable services but can be further used to plan for compliance based service mapping. For example, graph structures can be compiled based on regional data restrictions for different end users of a computer program (e.g., application, etc.) supported by a plurality of services. Developers can more easily identify which services cannot be supported within a particular required boundary (e.g., by generating service object lists sorted by associated host countries) and can develop internal services accordingly or exchange non-compliant services for compliant services.

Some services may be deployed to dynamically configure their resource usage based on a greater or lesser dynamic load during runtime. For example, a service with a greater dynamic load during runtime may scale out its resource usage while the service may scale in its resource usage when there is a lesser dynamic load during runtime. Service dependency work graph data structures, that can be compiled from the generated service objects, can be utilized to monitor this fluctuation in the dynamic loading of a service either with live customer traffic or simulated data. These changes and fluctuations in the service and its related performance may be configured as additional objects within the work graph data structure. Developers utilizing the work graph may then take further action to send notifications associated with the dynamic loading of a service or to run further compilation checks for the service.

Moreover, various embodiments provide program developers and end-users with the pertinent information needed to implement service dependent software. Specifically, some embodiments limit the collection of service related data to the pertinent information requested by a developer. This limitation of developer defined data collection avoids excess traffic volume on the network and the related hindrance of network performance. Further, this allows embodiments of the present disclosure to perform functionality disclosed herein without the burdensome computational expense of traditional deployment systems which require multiple engineers or architects each contributing portions of service data via the network. The collected service data can then be used to analyze conditions relative to particular services or supported software programs. This provides a specific improvement over prior systems, resulting in improved service monitoring and development strategies in response to client requirements.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a service made available by a server. The server is often, but not always, on another computer system, in which case the client accesses the service by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "multi-layer service oriented platform" refers to a computing environment associated with one or more computing devices and one or more applications, where the environment enables the discovery of information associated with services supporting at least one application. In some embodiments, the services subject to discovery are associated directly or indirectly with an application supported by the services. In some embodiments, the services can support the application over one or more communication networks. The multi-layer service oriented platform can include another application to generate and update a repository of collected information for each service (e.g., service object repository). Accordingly, the multi-layer service oriented platform can support an application for the collection of information, in the form of service objects, to generate work graphs associated with one or more services. In some embodiments, applications can compare information collected for a service with information collected for another service or a predefined threshold criteria.

The term "application," "application software," "app," or similar terms refer to a computer program or group of computer programs designed for use by and interaction with one or more networked or remote computing devices. Examples of an application comprise workflow engines, service desk incident management, team collaboration suites, cloud services, word processors, spreadsheets, accounting applications, web browsers, email clients, media players, file viewers, videogames, and photo/video editors. An application can be supported by one or more services either via direct communication with the service or indirectly by relying on a service that is in turn supported by one or more other services.

The term "service" refers to a software functionality or a set of software functionalities, such as the retrieval of specified information or the execution of a set of operations, with a purpose that different clients can reuse for their respective purposes, together with the policies that should control its usage, for example, based on the identity of the client (e.g., an application, another service, etc.) requesting the service. Additionally, a service may support, or be supported by, at least one other service via a service dependency relationship. For example, a translation application stored on a smartphone may call a translation dictionary service at a server in order to translate a particular word or phrase between two languages. In such an example the translation application is dependent on the translation dictionary service to perform the translation task. In some embodiments, a service is offered by one computing device over a network to one or more other computing devices. Additionally, the service may be stored, offered, and utilized by a single computing device to local applications stored thereon and in such embodiments a network would not be required. In some embodiments, services may be accessed by other services via a plurality of Application Programming Interfaces (APIs), for example, JavaScript Object Notation (JSON), Extensible Markup Language (XML), Simple Object Access Protocol (SOAP), Hypertext Markup Language (HTML), the like, or combinations thereof. In some embodiments, services may be configured to capture or utilize database information and asynchronous communications via message queues (e.g., Event Bus). Non-limiting examples of services include an open source API definition format, an internal developer tool, web based HTTP services, databased services, and asynchronous message queues which facilitate service-to-service communications. In some embodiments, a service can represent an operation with a specified outcome and can further be a self-contained software program. In some embodiments, a service from the perspective of the client (e.g., another service, application, etc.) can be a black box meaning that the client need not be aware of the service's inner workings.

The term "service object" refers to a data structure that represents at least one property of a service. The service object can take the structural form of a vector or other appropriate data structure for representing the service and its associated properties and/or data. For example, a service object can represent a web service provided by a server to a plurality of other computing devices over a wired and/or wireless network and, as such, the service object can contain properties associated with the web service such as an IP address, API, or the like. Service objects can be configured to follow a predefined format, such that an application can collect and store substantially similar data for each represented service in its respective service object. Data or metadata collected for each service to be represented by an associated service object can be collected directly from the service itself, a computing device associated with the service, and/or from an existing repository of service objects. In some embodiments, a service object can also represent an application or other non-service computer program that utilizes at least one service. In some embodiments, the service object may comprise a service object identifier and an attribute, the attribute comprising an array of name and value pairs with properties associated with the service. For example, a service object may be structured as: Service {Id: graph-service-1 Attributes: [{name: geolocations, value: [us, eu]}, {name: level, value: HIGH_PRIORITY},]}.

The terms "internal service," "internal resource," or similar terms refer to a software program, application, platform, or service that is configured by a software developer to provide functionality to another one or more of their software programs, applications, platforms, or services, either directly or indirectly through one or more other services, as opposed to using an external service. Internal services operate on a compiled code base or repository that is at least partially shared by an application which utilizes the functionality provided by the internal service. In some embodiments, the application code base and the internal service code base are hosted on the same computing device or across an intranet of computing devices. An application communicates with internal services within a shared architectural programming layer without external network or firewall separation. In some embodiments, an internal service is used only within the application layer which utilizes the internal services functionality. Information related to internal services can be collected and compiled into service objects which can also be referred to as internal service objects. An example embodiment of an internal service is a load balancer configured for routing and mapping API and/or service locations. Internal services may be configured for information-based shard routing, or in other words, routing and mapping API and/or service locations based on predefined custom service requirements associated with an application. For example, an internal service may be configured to identify where communication traffic originates from and then reply to the communications utilizing another service for reply communication.

The terms "external service," "external resource," "remote resource," or similar terms refer to a software program, application, platform, or service that is configured to communicate with another software program, application, platform, or service via a network architecture. In some embodiments, communications between an external service and an application calling the external service takes place through a firewall and/or other network security features. The external service operates on a compiled code base or repository that is separate and distinct from that which supports the application calling the external service. The external services of some embodiments generate data or otherwise provide usable functionality to an application calling the external service. In other embodiments, the application calling the external service passes data to the external service. In some embodiments, the external service may communicate with an application calling the external service, and vice versa, through one or more application program interfaces (APIs). For example, the application calling the external service may subscribe to an API of the external service that is configured to transmit data. In some embodiments, the external service receives tokens or other authentication credentials that are used to facilitate secure communication between the external service and an application calling the external service in view of the applications network security features or protocols (e.g., network firewall protocols). An example embodiment of an external service may include cloud services (e.g., AWS®).

The term "service object set" refers to a data structure containing one or more service objects, or service object identifiers associated therewith. A service object set may be compiled based on one or more criteria (e.g., service object data score, service object reliability score, service object criticality score, service dependency data type conflict, data residency requirement, a respective service's API compatibility, respective service's host region/country associations, the like, or combinations thereof).

The term "service object data" refers to one or more data items or elements associated with a service that are collected and represented as part of a service object. The service object data may refer to any information associated with the service represented by the service object, such as, for example, service dependency relationships, service object identifiers, performance metrics for the respective service (e.g., processor usage, access logs, crash reports, etc.), encryption keys, hardware requirements, associated computing devices, IP addresses, API compatibility, a host computing device's physical location (e.g., GPS coordinates, country name, etc.), the like, or combinations thereof. In some embodiments, the service object data may be one or more encrypted or unencrypted files, for example, JavaScript Object Notation (JSON) files, Extensible Markup Language (XML) files, Simple Object Access Protocol (SOAP) files, Hypertext Markup Language (HTML) files, the like, or combinations thereof. In some embodiments, service object data may comprise one or more of a service object identifier and an attribute associated with a service. In embodiments, the attribute may comprise an array of name and value pairs representative of properties of the service such as a service host name and/or geolocation. For example, service object data may be structured with attributes associated with a host service as: Host Id: graph-host-1 Attributes: [{name: geolocations, value: [us, eu]}, {name: name, value: hostx.foo.internal.company.net},]}. In some embodiments, service object data may be fetched from a host system or server for one or more services.

The term "service object identifier" refers to one or more data items or elements by which a service object may be uniquely identified. The service object identifier may include, for example, one or more of Internet Protocol (IP) addresses associated with a service, Uniform Resource Locators (URLs) associated with a service, numerical characters, alphabetical characters, alphanumeric codes, American Standard Code for Information Interchange (ASCII) characters, encryption keys, identification certificates, the like, or combinations thereof. An example embodiment of a service object identifier may comprise data provided by at least a service author, for example, a URL and a payload associated with a service. In some embodiments, the payload comprises a JSON formatted text that is either posted, by way of an HTTP POST, to a service when a resource is created or returned from a service, through an HTTP GET, when at least a resource is requested from the service.

The term "non-compliant service" refers to a service that is associated with one or more conflict types (e.g., service dependency data type conflict, service dependency data residency type conflict, etc.) identified by an application. For example, in an instance a first application is configured to identify all services, used by a second application, that are hosted outside of the European Union, a service associated with an IP address associated with a location in Canada would be identified by the first application as a non-compliant service (e.g., via a report of non-compliant services, via a graphical rendering of a service dependency work graph structure, etc.). Additionally, the first application can be configured to identify service objects, associated with non-compliant services, via particular service object identifiers. For example, once a service is determined to be in conflict a prefix/suffix code can be added to its service object identifier which indicates to one or more applications that the service is a non-compliant service. Moreover, one or more applications can be configured to identify non-compliant services by way of one or more score values assigned to the service.

The term "service dependency object" refers to a data structure representing a relationship between a service, or application, that relies on the functionality or a set of functionalities provided by another service. For example, an application may receive encrypted data from a first service, or application, and in order for the application to read the encrypted data it needs to be authenticated by a second service, which upon authentication provides an encryption key to read the encrypted data. In such an example, the service dependency object can be configured to represent a relationship between the first service, or application, and the second service. For example, the service dependency object may identify that an authentication process relationship requires the exchange of encrypted data. In some embodiments, service dependency objects can be configured to identify the first service, or application, and the second service such as by storing service object identifiers associated with each.

The term "service dependency object identifier" refers to one or more data items or elements by which a service dependency object may be uniquely identified. The service dependency object identifier may include, for example, one or more of Internet Protocol (IP) addresses associated with a first and/or second service, Uniform Resource Locators (URLs) associated with a first and/or second service, numerical characters, alphabetical characters, alphanumeric codes, American Standard Code for Information Interchange (ASCII) characters, encryption keys, identification certificates, the like, or combinations thereof.

The term "service object repository" refers to a database stored on a memory device which is accessible by one or more computing devices for retrieval and storage of one or more of service objects, service dependency objects, the like, or combinations thereof. The service object repository may be configured to organize service objects stored therein in accordance with a particular service object category. For example, service object categories may comprise one or more service objects associated with one or more applications, service dependency objects, network functions, APIs, Web services, geographical locations, the like, or combinations thereof. In some embodiments, the service object repository may be stored on a server remotely accessible by a computing device or on a memory device on-board the computing device.

The term "limited service" refers to a service that is associated with one or more reliability criteria that do not meet a performance threshold as defined in and measured by one or more applications. For example, in an instance an application is configured to track a number of times that a service disconnects from the application, another application, or another service, within a period of time, the service may be determined to be a limited service if it disconnects more than five times in one hour. Additionally, the application can be configured to identify service objects, associated with limited services, via particular service object identifiers. For example, once a service is determined to be limited a prefix/suffix code can be added to its service object identifier which indicates to one or more applications that the service is a limited service. Moreover, the application can be configured to identify limited services by way of one or more score values assigned to the service. For example, a limited service may be any service identified, by the application, that has been scored relative (e.g., greater than, less than, equal to, etc.) to one or more threshold values (e.g., a service object reliability score that is less than a service guarantee threshold, etc.) and/or another service that offers substantially similar functionality.

The term "service guarantee" refers to a guarantee made by a service provider (e.g., a service developer), or third-party thereto (e.g., a host server provider), that one or more services will perform in accordance with at least a quality of service (QoS) metric. The QoS metrics used to define the service guarantee may include, for example, an average time for the service to respond to a request, a number of APIs or types of APIs supported by the service, accessibility to the service based on one or more geolocations (e.g., location of the service server, location of the computing device accessing the service, etc.), one or more network providers, computing device signal strength, time of day, estimated periodic downtime, historical data (e.g., previous actual downtime, access logs, etc.), the like, or combinations thereof. Information associated with the service guarantee can be stored and retrieved by one or more applications associated with one or more computing devices. In some embodiments, service guarantees may comprise deploying a service in accordance with security restrictions. For example, access to a service may be restricted based on a client's IP address and therefore only clients with certain listed IP addresses may access confidential information or services provided by a host. Certain cleared or allowed IP addresses, or ranges of IP addresses, may be preconfigured and provided to a service host, by a client, in order to maintain the security restrictions. In some embodiments, a service guarantee may require a service host to implement cloud based computing encryption techniques such as Bring Your Own Key (BYOK). The BYOK cloud computing security model is configured to allow the client to utilize their own encryption software and manage their own encryption keys. For example, a client may utilize a virtualized example of their own encryption software together with the services they are hosted via a cloud server, in order to encrypt their data.

The term "service dependency work graph structure" refers to a data structure configured to represent dependency relationships between an application and its associated services. For example, a service dependency work graph structure may comprise service objects and service object dependencies that represent networks of communication, data organization, computing devices, data exchanged, the like, or combinations thereof for a plurality of services relied on by an application. In some embodiments, service objects are represented by nodes of the service dependency work graph structure. In some embodiments, service dependency objects are represented by edges of the service dependency work graph structure. In some embodiments, a graphical representation of the service dependency work graph structure can be, at least partially, rendered via a graphical user interface. The service dependency work graph structure can comprise one or more weighted graphs, multigraphs, isomorphic graphs, trees, the like, or combinations thereof.

The terms "dependency data structure," "dependency data path," or the like refers to a combination of one or more service objects and/or one or more service dependency objects within a service dependency work graph structure that connects a first service object to a second service object.

The term "service dependency interface type" refers to a particular API, type of API, or the like, that facilitates the exchange of data between services.

The term "service dependency data type" refers to a type of data object or functional operation type exchanged between services. For example, a first service may be dependent on a second service to provide data lookup. In such an example, the service dependency data type would be a lookup type. The service dependency data type may comprise one or more of a Domain Name System (DNS) lookup, tracing, access logs, messaging, manual, service, domain names, data classification, the like, or combinations thereof. In some embodiments of the present disclosure a developer can define service dependency data types and criteria associated therewith such that one or more applications can identify the developer defined service dependency data types for services from service object data.

The term "service dependency data residency type" refers to a particular service dependency data type which identifies a residency requirement associated with data exchanged between services. The service dependency data residency type is indicative of a relative geolocation (e.g., geolocation identifying data object) associated with one or more services, and data received or transfer thereby, with respect to a dependent application. In some embodiments, service dependency data residency type may be assigned to a first service based on the service relationship to a second service. For example, if the first service is hosted in country A and is dependent on a function from the second service hosted in country B the service dependency data residency type for the second service may be set to represent a foreign location. If country B was also determined to be a safe country for data transfer by country A then the service dependency data residency type for the second service may be set to represent a foreign but safe or allowed location. The service dependency data residency types may include, for example, local, foreign, secure, unsecured, allowed, restricted, preferred, a particular country (e.g., Spain, etc.), the like, or combinations thereof. In some embodiments, the service dependency data residency types may be represented by numerical code, alphabetical code, the like, or combinations thereof.

The term "service dependency work graph node," "node," or the like may be used interchangeably to refer to a node or vertex of a service dependency work graph structure. The service dependency work graph node is representative of a service object associated with the service dependency work graph structure. Accordingly, the service dependency work graph node may represent a service in relation to service dependency relationships further represented by edges, links, or lines within the service dependency work graph structure.

The term "service dependency work graph edge," "edge," or the like may be used interchangeably to refer to a representation of a relationship between a first service, represented by a first service dependency work graph node, and a second service, represented by a second service dependency work graph node, depicted within a service dependency work graph structure. In some embodiments, the service dependency work graph edge may be represented by one or more lines, links, arrows, the like, or combinations thereof.

The terms "service relationship," "service dependency relationship," or similar terms refer to an exchange of data and/or functionality between a first service, or application, and a second service. For example, the first service may be directly dependent upon the second service for a DNS lookup. In some embodiments, the second service may be directly dependent upon a third service whereby the first service is transitively dependent upon the third service via the second service. As such, the service dependency relationship may be a direct relationship comprising two services or it may be a transitive relationship comprising a plurality of services. In some embodiments, a first service and a second service may have a plurality of dependency relationships between them. For example, the second service may perform both a lookup and access log function for the first service.

The term "nested service dependency" refers to a plurality of services that are interdependent on each other such that a first service is transitively dependent on at least one other service via a second service. For example, a graph (e.g., tree) representing a nested service dependency may be structured in such a way as to represent that a first service, represented by a first service object, is dependent on a plurality of second services, each represented by their own respective service object, which are in turn each dependent upon a plurality of third services, each represented by their own respective service object. In some embodiments, the nested service dependency may be represented by a nested service dependency object that comprises data for one or more transitive service object relationships. For example, a nested service dependency may capture dependent relationships that traverse more than two directly communicable services. The information captured for an associated nested service dependency may comprise all service dependencies stemming from a service. A query to a service dependency work graph data structure, according to embodiments herein, can be made for one or more of a dependency relationship directly associated with a service, a dependency relationship removed from a service according to a fixed number of transitive relationships, or all dependency relationships stemming from a service without a transitive number restriction. In some embodiments, a service dependency work graph data structure may support intelligent groupings of dependency relationships. For example, a linear chain of five dependent services may be grouped into a single nested service dependency for convenient representation.

The term "nested service dependency structure" refers to a data structure that comprises a plurality of service objects associated with a particular nested service dependency.

The term "nested service dependency object identifier" refers to one or more data items or elements by which a plurality of service objects associated with a particular nested service dependency relationship may be identified. In some embodiments, the nested service dependency object identifier comprises, at least partially, the service object identifier for each associated service object.

The term "resource detection" refers to detection of service related data indicative of an owner, provider, location, source, the like, or combinations thereof for one or more services. In some embodiments, the resource detection may be configured to detect system resources allocated to a particular service or other services dependent thereon. The resource detection may be configured to detect, for example, one or more Internet Protocol (IP) addresses, Uniform Resource Locators (URLs), numerical characters, alphabetical characters, American Standard Code for Information Interchange (ASCII) characters, encryption keys, identification certificates, the like, or combinations thereof. In some embodiments of the present disclosure, the data detected by the resource detection is stored in a service object repository.

The term "third-party resource detection" refers to detection of service related data indicative of an owner, provider, application, location, the like, or combinations thereof for a service. The third-party resource detection may detect, for example, one or more Internet Protocol (IP) addresses, Uniform Resource Locators (URLs), numerical characters, alphabetical characters, American Standard Code for Information Interchange (ASCII) characters, encryption keys, identification certificates, the like, or combinations thereof. In some embodiments of the present disclosure, the data detected is stored in a service object repository.

The term "strength measure" refers to a numerical value assigned to a quality of service (QoS) metric. In embodiments, a strength measure may be used to measure service dependencies, represented by service dependency objects, based on one or more QoS metrics of a particular type. The strength measure of a QoS metric of a service may be compared to one or more other services with a substantially similar QoS metric or compared to a predefined value set for a particular QoS metric or type of QoS metric.

The term "service object reliability score" or "reliability score" refers to a numerical value associated with (e.g., or assigned to) a service, represented by a service object, based on a QoS metric defined by a relationship between the service and another service dependent thereon. The service object reliability score is based on historical reliability data.

The term "historical reliability data" refers to one or more data items or elements associated with a service that comprises service object historical data, service object relationship historical data, previous iterations of the service dependency work graph structure, service outage logs, message persistence, message acknowledgements, message resend attempts, duplicate message eliminations, priority message delivery order, sender delivery status, receiver delivery status, the like, or combinations thereof.

The term "aggregated service object reliability score" refers to a service object reliability score that is determined based on one or more service object reliability scores, historical data related to the one or more service object reliability scores, the like, or combinations thereof.

The term "service object reliability score list" refers to a data object that contains one or more of a service object reliability score, an aggregated service object reliability score, a service guarantee threshold, the like, or combinations thereof that corresponds to a respective service object set.

The term "replaceable service" refers to a given service that may be replaced by a different service with respect to a particular functional relationship therebetween. For example, a first service, represented by a first service object (i.e., a replaceable service object), may be substituted by a second service, represented by a second service object (i.e., a replacement service object), with respect to a particular functional relationship therebetween, represented by a service dependency object. In some embodiments, one or more applications may identify a service as a replaceable service and update the service object and/or service object identifier associated the with replaceable service accordingly. In some embodiments, multiple versions or instances of the same service may be executed and/or instantiated via one or more servers and the multiple versions or instances of the same service are identified to be utilized as replaceable services in relation to each other. In some embodiments, a replacement service may be a different service from the service it is replacing and, in accordance with this embodiment, the replacement service may be configured with an identifier to indicate that the service may be utilized as a replacement for one or more identified services.

The term "service guarantee threshold" refers to a threshold value associated with a service guarantee against which service reliability for one or more services is measured. The service guarantee threshold may be determined based at least on a predefined threshold value set by a service provider or third party thereto. Additionally, the service guarantee threshold may be a dynamically determined threshold value that is programmatically determined. In some embodiments, the dynamically determined threshold value is determined based at least on an aggregated service object reliability score and may be automatically updated periodically.

The term "service object criticality score" refers to a numerical value assigned to a service indicative of the service's importance to the proper functioning of one or more applications based on data extrapolated from a service dependency work graph structure. Service object criticality scores are associated with the service object identifiers of a service, represented by a service object, and represent a level of reliance between the service and a number of other services. In some embodiments, the service object criticality score of a first service may be increased: as the number of other services that are dependent on the first service increases; as the number of alternative services that can be used as alternatives or replacements for the first service decreases; or as a particular function provided by the first service is determined to be critical for the proper functioning of an application. In some embodiments, the service object criticality score may be initially set by a predefined value and/or dynamically updated periodically, with the service dependency work graph structure, by one or more applications associated with the service dependency work graph structure.

The term "service dependency data type conflict" refers to a conflict between two or more services due to a dependency data type restriction placed on one or more of the services. For example, a service dependency data type conflict may be detected by one or more applications due to a service dependency data type requirement associated with a first service, or application, that dependents on a service of a particular data type performed by a second service. In some embodiments, the service dependency data type may include Domain Name System (DNS) lookup, tracing, access logs, messaging, manual, service, domain names, data classification, the like, or combinations thereof.

The term "service object data score" refers to a data structure that describes a numerical value associated with service object data associated with a particular service. The service object data score may be determined based on multiple metrics associated with the service object data. For example, service object data metrics may include availability, transformability, file or data type, priority, encryption, language, location of the service object(s) which at least partially generated, transmitted, or modified the service object data, security scan results, the like, or combinations thereof.

The terms "ranking," "rank," or the like, as used herein, refers to a relationship between a plurality of service objects such that each service represented by each service object of the plurality of service objects is assigned a respective score based on a ranking criteria (e.g., service object data score, service object reliability score, service object criticality score, service dependency data type conflict, data residency requirement, etc.) and sorted relative to their respective scores and/or another standard of measurement (e.g., a service guarantee threshold, etc.).

The terms "co-ranking," "co-rank," or the like, as used herein, refers to a relationship between a plurality of service objects such that each service represented by each service object of the plurality of service objects is assigned a respective aggregate score based on a plurality of ranking criteria (e.g., service object data score, service object reliability score, service object criticality score, service dependency data type conflict, data residency requirement, etc.) and sorted relative to their respective scores and/or another standard of measurement (e.g., a service guarantee threshold, etc.). Additionally, the plurality of ranking criteria may be combined to generate each respective aggregate score such as by averaging the plurality of ranking criteria. Additionally, one or more ranking criteria of the plurality of ranking criteria may be given more consideration during co-ranking such that the one or more ranking criteria may contribute to each respective aggregate score in greater or lesser proportion then the other ranking criteria.

The term "data residency requirement" refers to a restriction placed on data transferred to, generated by, accessed by, or store with a service, represented by a service object, stored on a server, or the like, in a particular geographical location. The data residency requirement, for example, may require that particular data is not transmitted from a computing device in a first country or region to a server in a second country or region. Data residency requirements may be required by governments, non-governmental organizations (e.g., International Organization for Standardization (ISO)), private entities (e.g., private corporations), or the like to protect the security of sensitive information (e.g., information pertaining to national security, trade secrets, patient health data, etc.). In some embodiments, geographical locations may include a town, city, ward, district, county, state, province, region, block of countries (e.g., the European Union), island, continent, the like, and any combinations or divisions thereof. In some embodiments, subsets of geographical locations may establish their own data residency requirements while also adhering to requirements of another body. For example, Germany may issue their own data residency requirements for handling medical data while also adhering to data residency requirements agreed upon by the European Union. In some embodiments, to monitor adherence to a data residency requirement a work graph may comprise information associated with how services transfer and store data. For example, a service dependency work graph data structure may include information related to an IP addresses of a client accessing data or the IP address of a server storing data.

The term "service dependency data residency type conflict" refers to a conflict between two or more services, represented by their own respective service objects, due to a data residency requirement placed on one or more of the services. The service dependency data residency type conflict may be caused by a data residency requirement placed on a first service that depends on a function performed by a second service associated with a particular geographical location. In some embodiments, the service dependency data residency type conflict may be detected by computing device that in response to the detection prevents an application executed by the computing device from using a first service that utilizes the functionality of a restricted second service. The service dependency data residency type conflict may be detected any number of relationships away from the computing device, for example, the restricted service may be a third, fourth, fifth, etc. service in a hierarchy of dependent services.

The term "refresh command" refers to a signal which is configured to cause one or more services, applications, portions of computer program code, the like, or combinations thereof executed by, or run on, a computing device to re-run at least a portion of their program code. Additionally, the refresh command may be received by one or more computing devices via a communication interface, a user interface, application programming interface, the like, or combinations thereof. Additionally, the refresh command may be executed as a portion of computer program code in conjunction with a countdown timer such that the refresh command is automatically executed at least once. Additionally, the countdown timer portion of the computer program code may automatically reset after each iteration such that the refresh command is executed periodically. For example, a software application may be configured to dynamically and/or periodically fetch information associated with one or more services based on a push message or a pull notification. In some embodiments, a push message may comprise data taken from one or more service dependency work graph data structures (e.g., service object data, etc.) and a pull notification may comprise information fetched from one or more services (e.g., IP address, host name, etc.).

The term "service dependency discovery request" refers to a signal received by one or more computing devices (e.g., client devices, servers, etc.) which are configured to cause a dynamic service dependency discovery system associated with the one or more computing devices to return service object data associated with one or more services, represented by their own respective service objects, identified via the service dependency discovery request. The service dependency discovery request may be received via a user interface, communication interface, the like, or combinations thereof. The service dependency discovery request may be generated by the dynamic service dependency discovery system via one or more computer program instructions.

The term "geolocation identifying data object" refers to a data object received from a computing device, associated with one or more applications for service tracking and discovery, that indicates a geolocation of the computing device at a time interval indicated in the geolocation identifying data object and/or at a time interval deemed to be sufficiently close to a time of dispatch and/or a time of receipt of the geolocation identifying data object. Examples of geolocation identifying data objects include data objects that indicate GPS coordinates of a data object or computing device at a particular time. Other examples of geolocation identifying data objects may include data objects that indicate one or more IP addresses associated with a service or service host.

The term "time dimension" refers to tagging one or more data objects with a time stamp in order to reference when a data object was created and/or updated. For example, a first service object may be added to a service dependency work graph data structure and tagged with a time stamp for '01:00:00 AM' and then the first service may be replaced by a second service at '01:05:00 AM.' In such an embodiment, a service dependency work graph data structure may be tracked for changes over time and as such a service dependency graph data structure can represent certain service dependencies for a given time based on historical data recorded in relation to a time stamp.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

Figure 1:
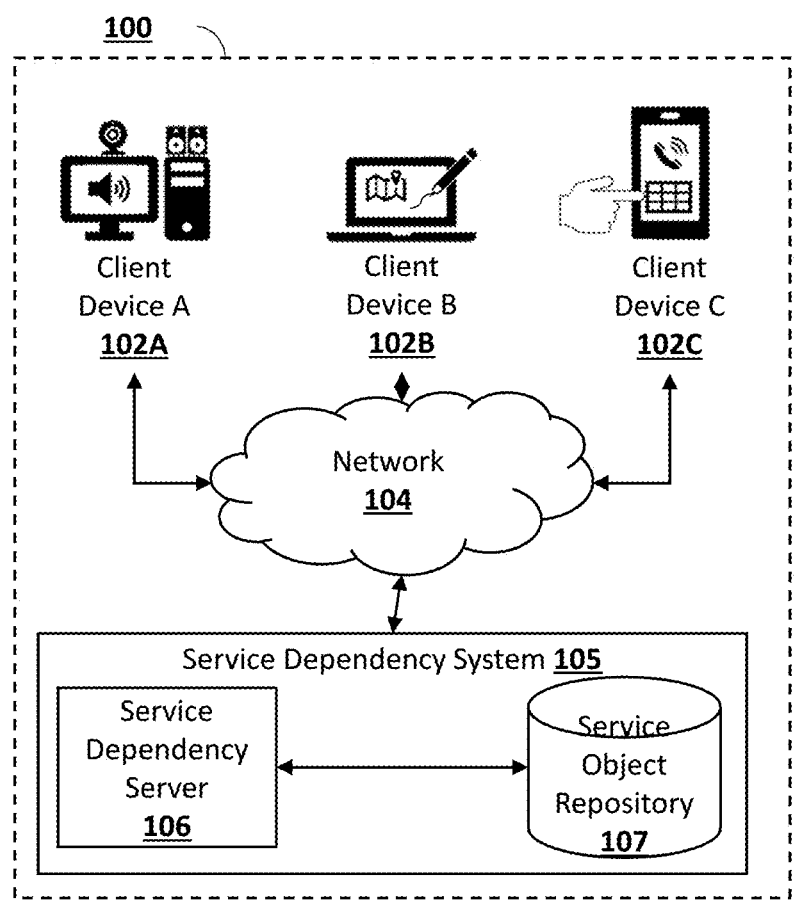
FIG. 1 is a block diagram of an example service dependency system within which at least some embodiments of the present disclosure may operate.

FIG. 1 illustrates an example system architecture 100 within which embodiments of the present disclosure may operate. The architecture 100 includes a service dependency system 105 configured to interact with one or more client devices 102A-C, such as client device 102A, client device 102B, and client device 102C. The service dependency system 105 may be configured to receive service dependency discovery requests from the client devices 102A-C, process the service dependency discovery requests to generate one or more user interfaces (e.g., service dependency work graph structure, printable reports, graphical user interfaces, etc.) that include data associated with the one or more services, each represented by their own respective service object, identified via the service dependency discovery request, and provide data for rendering the user interfaces to the client devices 102A-C. For example, by presenting the client devices with a service dependency work graph structure comprising service dependency work graph nodes connected by way of service dependency work graph edges. The service dependency system 105 may be configured to detect the current geolocation of one or more computing devices, service objects, service dependency objects, the like, or combination there and provide geolocation identifying data objects associated therewith. The geolocation identifying data objects provided being deemed relevant to the one or more services identified via the service dependency discovery request.

The service dependency system 105 may communicate with the client devices 102A-C using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JavaScript Object Notation (JSON) objects sent via a WebSocket channel. In some embodiments, the protocol is JSON over RPC, JSON over REST/HTTP, the like, or combinations thereof.

The service dependency system 105 may include a service dependency server 106 and a service object repository 107. The service dependency server 106 may be configured to detect service object data. The service dependency server 106 may be configured to determine service object detentions, service dependency objects, limited service objects, service object reliability scores, replaceable service objects, service object criticality scores, service guarantee thresholds, service dependency data type conflict, service object data scores, rankings, co-rankings, data residency requirement, service dependency data residency type conflict, the like, or combinations thereof for services, represented by respective service objects, identified by a service dependency discovery request from one or more client devices. Additionally, the service dependency server 106 may be configured to determine one or more of service object detentions, service dependency objects, limited service objects, service object reliability scores, replaceable service objects, service object criticality scores, service guarantee thresholds, service dependency data type conflict, service object data scores, rankings, co-rankings, data residency requirement, service dependency data residency type conflict, the like, or combinations thereof for service objects detected, by the service dependency server 106, as being associated with services running on a client device. The service dependency server 106 may be configured to generate one or more of a service object set, service object data, service object reliability scores, service object criticality scores, rankings, co-rankings, data residency requirement, service dependency work graph structures, dependency data structures, user interfaces, the like, or combinations thereof. The service dependency server 106 may be configured to generate automatic and dynamic push notification user interfaces for service objects based on one or more set criteria (e.g., service object data score, service object reliability score, service object criticality score, service dependency data type conflict, data residency requirement, etc.) comprising information related to the particular service object and the one or more set criteria which may be predefined by a client device.

The service object repository 107 may store data associated with one or more service objects associated with the service dependency system 105. For example, the service object repository 107 may store data associated with one or more service object data, service dependency objects, service dependency object identifiers, service guarantees, service dependency work graph structures, service dependency data type, the like, any division, and/or combinations thereof. The service object repository 107 may include one or more storage units, such as multiple distributed storage units that are connected through a computer network. Each storage unit in the service object repository 107 may store at least one of one or more data assets and/or one or more data about the computed properties of one or more data assets. Moreover, each storage unit in the service object repository 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

Figure 2:
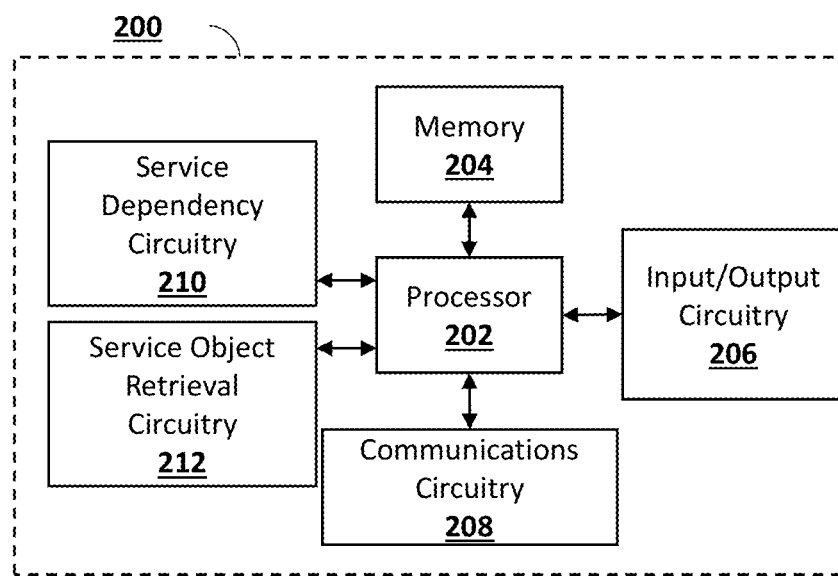
FIG. 2 is a block diagram of an example service dependency apparatus configured in accordance with at least some embodiments of the present disclosure.

The service dependency server 106 may be embodied by one or more computing systems, such as apparatus 200 shown in FIG. 2. The apparatus 200 may include processor 202, memory 204, input/output circuitry 206, communications circuitry 208, service dependency circuitry 210, and service object retrieval circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The service dependency circuitry 210 may be any means such as a device or circuitry embodied in either hardware or a combination of hardware and software that is configured to receive a service dependency discovery request and identify service object data associated with one or more service, each represented by their own respective service object. In some embodiments, the service dependency circuitry 210 may be configured to determine service object detentions, service dependency objects, limited service objects, service object reliability scores, replaceable service objects, service object criticality scores, service guarantee thresholds, service dependency data type conflict, service object data scores, rankings, co-rankings, data residency requirement, service dependency data residency type conflict, the like, or combinations thereof for service objects identified by a service dependency discovery request from one or more client devices. Additionally, the service dependency circuitry 210 may be configured to determine one or more of service object detentions, service dependency objects, limited service objects, service object reliability scores, replaceable service objects, service object criticality scores, service guarantee thresholds, service dependency data type conflict, service object data scores, rankings, co-rankings, data residency requirement, service dependency data residency type conflict, the like, or combinations thereof for service objects detected, by the service dependency circuitry 210, as being associated with services running on a client device. The service dependency circuitry 210 may be configured to generate one or more of a service object set, service object data, service object reliability scores, service object criticality scores, rankings, co-rankings, data residency requirement, service dependency work graph structures, dependency data structures, user interfaces, the like, or combinations thereof. The service dependency circuitry 210 may be configured to generate automatic and dynamic push notification user interfaces for services, each represented by their own respective service object, based on one or more set criteria (e.g., service object data score, service object reliability score, service object criticality score, service dependency data type conflict, data residency requirement, etc.) comprising information related to the particular service and the one or more set criteria which may be predefined by a client device. In some embodiments, to obtain service object data from one or more client devices associated with one or more services, the service dependency circuitry 210 utilizes the communications circuitry 208 to transmit application programming interface (API) calls to one or more API servers associated with the noted client devices.

The service object retrieval circuitry 212 may be any means such as a device or circuitry embodied in either hardware or a combination of hardware and software that is configured to generate service dependency discovery requests. In some embodiments the service object retrieval circuitry 212 is configured to ping one or more computing device associated with one or more services, such as via an internet control message protocol, to receive information related to the one or more services or computing devices (e.g., service object data, etc.). In some embodiments the service object retrieval circuitry 212 is configured store received information in the service object repository 107. In some embodiments, the service object repository 107 may comprise one or more of a single unified repository, a single partitioned repository, or a plurality of isolated repositories comprising one or more partitions. An example embodiment of service object repository 107 may comprise separate partitions for isolating sensitive information, for example, classified government data. According to some embodiments, the service object retrieval circuitry 212, with the service dependency circuitry 210, determines scores (e.g., service object data score, etc.) or conflicts (e.g., service dependency data type conflict, etc.) for service objects stored in the service object repository 107 based on the service object data received, or generated, by the service dependency circuitry 210. The service object retrieval circuitry 212 may be further configured to retrieve service object data from the service object repository 107 based on the determined scores, or other information (e.g., a threshold value) associated with service objects. The service object retrieval circuitry 212 may be further configured to retrieve user interfaces, generated by the service dependency circuitry 210, that includes service object data associated with the retrieved service objects representing particular services. The service object retrieval circuitry 212 may also be configured to generate access logs and/or historical data including all information previously retrieved that is associated with a particular user, computing device, service, the like, or combinations thereof. Historical data may include service dependency work graph data records for a particular time interval. For example, when the service dependency work graph data structure is generated in relation to a particular service this may be the initial time for the service dependency work graph data structure. As the service dependency work graph data structure is maintained for the service and all dependencies thereof any modifications to the service dependency work graph data structure may be recorded with a time dimension. For example, if a service object is removed or replaced in the service dependency work graph data structure the time at which this modification occurs would be associated with a time dimension. This time dimension can then be used to review a service dependency work graph data structure for any given point of time in the past up to the initial start time associated with the service dependency work graph data structure.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
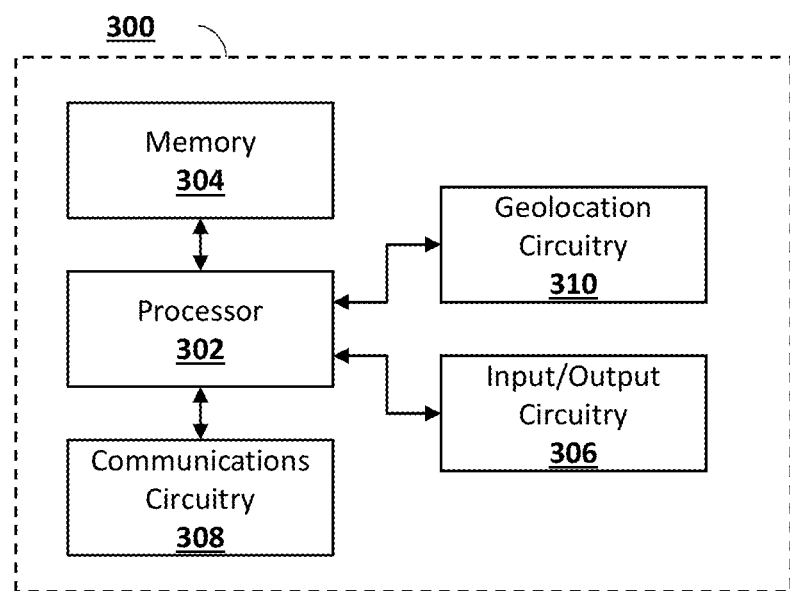
FIG. 3 is a block diagram of an example client device configured in accordance with at least some embodiments of the present disclosure.

Referring now to FIG. 3, the client device 102A-C may be embodied by one or more computing systems, such as apparatus 300 shown in FIG. 3. The apparatus 300 may include processor 302, memory 304, input/output circuitry 306, communications circuitry 308, and geolocation circuitry 310. Although these components 302-310 are described with respect to functional limitations, it should be understood that the particular implementations necessarily include the use of particular hardware. It should also be understood that certain of these components 302-310 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, services, or the like for enabling the apparatus 300 to carry out various functions in accordance with example embodiments of the present disclosure.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry, etc.) capable of performing operations according to an embodiment of the present disclosure while configured accordingly. Alternatively, as another example, when the processor 302 is embodied as an executor of software instructions (e.g., computer program instructions, etc.), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The geolocation circuitry 310 may be any means such as a device or circuitry embodied in either hardware or a combination of hardware and software that is configured to report a current geolocation of the apparatus 300. In some embodiments, the geolocation circuitry 310 may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry 310 may be configured to infer an indoor geolocation and/or a sub-structure geolocation of the apparatus 300 using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Figure 4:
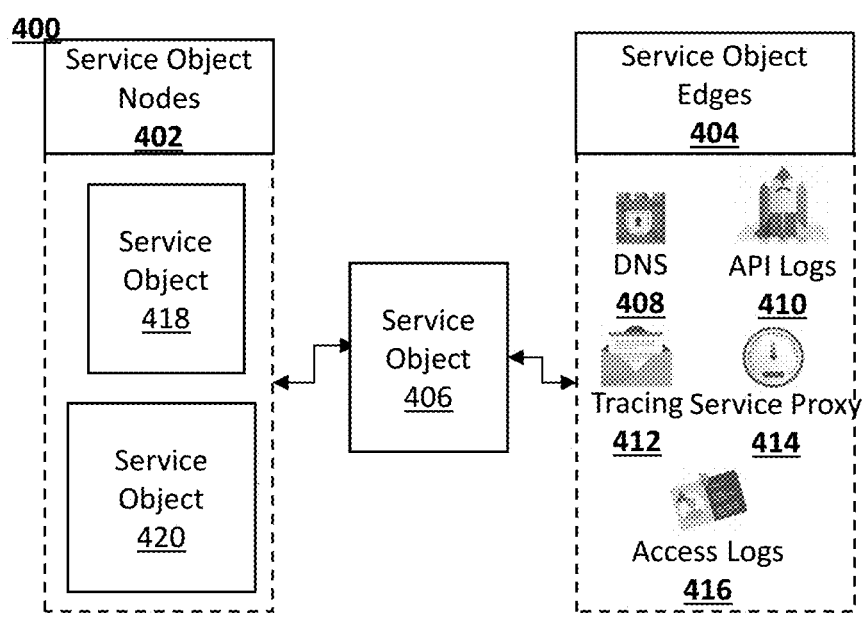
FIG. 4 is a block diagram of an example services dependent on other services and data sources in accordance with at least some embodiments of the present disclosure.

Referring now to FIG. 4, an example dependency data structure 400 is presented that illustrates an example service object 406, that represents a service (not shown), associated with various service dependency objects in accordance with at least some embodiments of the present disclosure.

As shown, a service, (e.g., a graph store), represented by service object 406, is supported by, and communicably connected via at least a network, with a plurality of other services and data. The plurality of other services and data are represented by service object nodes 402 and service object edges 404 respectively. As such, the connections, between service object 406 and the plurality of service object nodes 402 and service object edges 404, represent one or more of a functional service interface provided to or from the service as represented by service object 406. The service object nodes 402 comprise service object 418 and service object 420, each representing a respective service, which may be configured to receive information signals from and/or transmit information signals to the service associated with service object 406. Service object 418 represents a service that may be called by another service (e.g., the service represented by service object 406) to fetch information about one or more additional services. Service object 420 represents an open source tool to declare APIs.

Moreover, the service associated with service object 406 is further associated with a plurality of service object data as represented by service object edges 404. Each of service object edges 404 may contribute one or more data structures to service object 406. The service object edges 404, as shown, may comprise one or more of domain name system (DNS) lookup 408, application programming interface (API) logs 410, tracing 412, service proxy 414, and access logs 416.

Referring now to FIG. 5, example service dependency system work graph 500 is presented which illustrates an operational example of a service dependency work graph structure 504 and a services list 502 in accordance with at least some embodiments of the present disclosure. As shown, services list 502 comprises service objects 502A-C associated with services A-C (not shown) respectively. It should be appreciated that, as shown, service objects 502A-C may be represented by icons configured from the underlying data in service dependency system work graph 500 such that a user may be presented with additional service object data for services A-C by interacting with one or more of service objects 502A-C. For example, as illustrated, an input signal 512 is received by service dependency system work graph 500 in relation to service object 502A and in response service object retrieval circuitry 212 may retrieve additional service object data 512A. The additional service object data 512A from service dependency system work graph 500 is represented by way of services list 502. According to some embodiments, additional service object data 512A may be configured as a graphical icon, textual information, empirical data, another services list, a pop-up window, a data tree structure, the like, or combinations thereof.

An example embodiment of services list 502 may include services objects 502A-C configured as 'Service-One,' 'Service-Two,' and 'Service-Three' respectively. Each of 'Service-One,' 'Service-Two,' 'Service-Three' may further comprise respective attributes. The attributes comprising an array of name and/or value pairs with properties associated with the underlying service. For example, service object 502A may be identified as 'Service-One' in services list 502, 'Service-One' being the name of the underlying service represented by service object 502A, with additional service object data 512A associated therewith. In such an example, additional service object data 512A may comprise a first attribute such as 'tier=0' to identify 'Service-One' as having a given priority or service level associated with a tier of 0. Additionally, service object 502A associated with 'Service-One' may further comprise a second attribute. For example, service object 502A may identify 'Service-One' as an internal service or an external service via the second attribute, for example, the additional service object data may include the attribute 'author=internal' for 'Service-One.' Moreover, service object 502B may be named 'Service-Two,' after the underlying represented service, and may comprise similar attributes of 'tier=1' and 'author=internal.' The first attribute of 'tier=1' to identify 'Service-Two' as having a given priority or service level associated with a tier of 1 and the second attribute, 'author=internal,' denoting 'Service-Two' as an internal service.

As further shown in FIG. 5, services list 502 may be presented and coordinated with service dependency work graph structure 504. The example service dependency work graph structure 504 as depicted illustrates service dependency work graph nodes 506A-C, each representing a respective service A-C (not shown), and associated with service objects 502A-C respectively. The service dependency work graph structure 504 may represent a plurality of service dependencies. For example, service dependency work graph node 506A, that represents service A (not shown), is depicted as being dependently connected to service dependency work graph node 506B, that represents service B (not shown), by way of service dependency work graph edge 508, that represents the dependency relationship between service A and service B. Additionally, service dependency work graph node 506B is shown as being dependently connected to service dependency work graph node 506C, that represents service C (not shown), by way of service dependency work graph edge 510, that represents the dependency relationship between service B and service C. It should be appreciated that data may be transmitted and received bi-directionally by way of the connectivity represented by service dependency work graph edges 508 and 510. For example, service B may both send data to and receive data from service C in order to provide functionality to and/or receive functional services from service C. In some embodiments, service dependency work graph edges 508 and 510 may represent a plurality of service dependencies between their respective services, represented by service dependency work graph nodes 506A-C.

It should be appreciated that as input signals (e.g., input signal 512) are provided to service objects 502A-C the service dependency work graph structure 504 may change in appearance accordingly. It should be appreciated that input signals (e.g., input signal 512) may be provided via an API between applications, a user interface, the like, or combinations thereof. For example, as input signal 512 is received by service dependency system work graph 500, via service object 502A, and in response service object data 512A is displayed in services list 502 a coordinated response (not shown) may be displayed by service dependency work graph structure 504, such that additional service dependency work graph nodes may be represented in the service dependency work graph structure 504. Moreover, the additional service dependency work graph nodes may correspond to the services represented by service object data 512A in much the same way, as described herein, that service dependency work graph node 506A and service object 502A correspond to each other and underlying service A. In some embodiments, service dependency work graph structure 504 or services list 502 can be modified by service dependency system work graph 500 without inputs signals received via a user interface.

According to some embodiments, at least portions of services list 502 and the service dependency work graph structure 504 may be combined such that service dependency work graph nodes 506A-C are further configured to function in accordance with at least some of the functionality described herein with respect to service objects 502A-C. In such embodiments, services list 502, components thereof, and/or any functionality attributed thereto may be at least partially removed from example service dependency system work graph 500. It will be further appreciated that any portion of service dependency system work graph 500 may be configured to receive one or more input signals (e.g., input signal 512) to send/receive data to/from one or more components as described in reference to apparatus 200 and/or 300.

Additional embodiments of the service dependency work graph structure as described with respective to example service dependency system work graph 500 will now be set forth with reference to FIGS. 6-8 as follows.

Referring now to FIG. 6, an example service dependency work graph structure 600 is illustrated with a plurality of service dependency work graph nodes. In some embodiments, a service dependency work graph structure may be generated by a computing device such that the service dependency work graph structure is centered around one or more particular services, represented by a service object or example service dependency work graph node. In some embodiments, the particular service, or services, which the service dependency work graph structure is generated around may be at least partially defined by the service dependency discovery request received by the computing device which generates the service dependency work graph structure. Example service dependency work graph structure 600 is generated such that it is centered around service A which is represented by example service dependency work graph node 602A. As depicted service dependency work graph node 602A displays the name of the underlying service it represents, "Service A." According to other embodiments, service dependency work graph node 602A, and the like, may further comprise one or more of a symbol or number representing a location, software provide, company logo, measurable value (e.g., processor usage, etc.), the like, or combinations thereof.

As FIG. 6 illustrates, service A, represented by service dependency work graph node 602A, is dependent upon a plurality of other services B-G, represented by service dependency work graph nodes 602B-G respectively. For example, service A is directly dependent on functionality provided by services B-C and service E. Additionally, service A is transitively dependent on all of the services that services B-C and service E are directly or transitively dependent upon. Service B, for example, is directly dependent upon service F which is further dependent on service G. Service C is dependent upon service D and both service C-D are further dependent on service E. As such, service A is both directly and transitively dependent upon service E which provides functionality to services A, C, and D directly.

In some embodiments, multiple instances of a service may be provided. For example, an instance of service D may be provided by way of a fallback host system. Fallback, as used herein, refers to a passive node that becomes active only in certain conditions. In accordance with such an embodiment, should a different host executing another instance of service D become unavailable or unable to effectively support calls to service D from a service A, then service A may dynamically reroute those calls and communicate directly with an instance of service D executing via a fallback host system.

Similarly, a high performance or reliability instance of service D may be provided by way of a high quality of service host system. In accordance with such an embodiment, should service A be associated with a higher promised quality of service and require support from service D, service A may be configured to route calls to service D to the instance of service D executing by way of the high quality of service host system.

Such dependency structures as those generated for the relationships between services A-G and represented by service dependency work graph nodes 602A-G may be further describes as nested service dependency objects. The dependencies represented by service dependency work graph nodes 602A, 602B, 602F, and 602G represent a first nested service dependency object. Moreover, the dependencies represented by service dependency work graph nodes 602A, 602C, 602D, and 602E represent a second nested service dependency object. In some embodiments, the nested service dependency objects may be represented in accordance with a particular visual scheme so as to identify the different components or hierarchy represented therein. For example, the nodes categorized in the first nested service dependency object may be represented by substantially similar colors, shapes, or other visual identifiers so as to distinguish them from the nodes categorized in the second nested service dependency object.

Additionally, any of the service dependency work graph nodes 602A-G may be configured such that they may receive one or more input signals (e.g., input signal 612, etc.) and in response provide one or more output signals to be represented to service dependency work graph structure 600. For example, providing an input signal to service dependency work graph node 602B may collapse the first nested service dependency object into a single service dependency work graph node (not shown) representing all of services B-G. Subsequent input signals to the single service dependency work graph node representing all of services B-G may re-expand the first nested service dependency object to again be represented by service dependency work graph nodes 602B, 602F, and 602G.

Moreover, input signals received by a particular service dependency work graph node my cause a resource detection functionality feature to execute for a particular service, represented by the node, such that service object data is detected for the particular service and represented by a graphical user interface via one or more service objects and/or service object data. As illustrated service dependency work graph node 602A receives an input signal 612 and in response service object data is represented by the service dependency work graph structure 600 in the form of availability data 604A, DNS data 606A, and API data 608A.

The service object data represented by an example service dependency work graph structure will now be described further with reference to FIG. 7 which illustrates an example service dependency work graph structure 700. Service dependency work graph structure 700 depicts an input signal 712 as it is received by service dependency work graph node 702A which causes one or more software or hardware components of an apparatus (e.g., apparatus 200, 300, etc.) associated with service dependency work graph structure 700 to perform one or more tasks. The one or more tasks performed may comprise one or more of an initiation of resource detection including third party resource detection, a collapse or expansion of a nested service dependency object, display of data residency requirements, generation of a service dependency discovery request, determination of a geolocation identifying data object, the like, or a combination thereof with respect to a service represented by service dependency work graph node 702A.

In response to input signal 712, as illustrated, the apparatus associated with service dependency work graph structure 700 represents service object data associated with service A, by way of service dependency work graph node 702A. Service A, as depicted in FIG. 7, is shown to have availability data, DNS data, and API data associated therewith. Such that, the service object data represented by service dependency work graph structure 700 includes a plurality of service dependency work graph edges connecting service dependency work graph node 702A to service dependency work graph node 702B, availability data 704A, DNS data 706A, and API data 708A. As shown, service dependency work graph structure 700 may display availability data 704A for service A, represented by node 702A. For example, availability data 704A may comprise one or more of a ping response for a computing device associated with service A, a performance metric related to service A, the like, or combinations thereof. In some embodiments, the availability data may comprise one or more reliability responses from a service wherein the reliability response is determined to be a success if it does not contain a reply error. In some embodiments, the availability data may comprise one or more latency responses comprising a time required for replies from the associated service. The represented DNS data 706A may, for example, comprise one or more of a DNS lookup, a Start of Authority (SOA) record, an IP address, a simple mail transfer protocol (SMTP) mail exchanger (MX), name servers (NS), pointers for reverse DNS (rDNS) lookups (PTR), a domain name alias (CNAME), the like, or combinations thereof. The represented API data 708A may, for example, comprise information related to one or more of a computing interface (e.g., HTTP, etc.), a software architecture (e.g., representational state transfer (REST), etc.), a software library, an operating system, the like, or combinations thereof. In an example embodiments, API data 708A may comprise one or more of a call name such as 'get-org,' an API call method such as 'GET,' and an endpoint location such as '/admin/v/1/orgs' which may be accessible to a service. The dependency that service A has on an API may be represented by a service dependency work graph data structure as a method and a hosting URL. For example, 'Service-A GET /admin/v1/orgs'→DependsOn→'Service-B GET/admin/v1/orgs' may represent in an example service dependency work graph data structure how service A is dependent on a particular API call.

Service A is further shown, by FIG. 7, to be dependent on functional services provided by service B. For example, the dependency between service A and service B may be represented in a service dependency work graph data structure as 'Service-A→DependsOn→Service-B.' In some embodiments, additional information associated with service B may be 'Service-B→DeployedIn→eu-central' and this information may be determined by a service dependency work graph data structure by way of service B's host URL, 'Hostdomain1.serviceb.eu-central.company.com.' Service B is represented by service dependency work graph node 702B. Service dependency work graph node 702B may be similarly configured to service dependency work graph node 702A such that in response to an input signal (e.g., input signal 712, etc.) additional service object data may be displayed which is associated with service B. For example, the service object data, related to service B, displayed to service dependency work graph structure 700 may include a plurality of service dependency work graph edges connecting service dependency work graph node 702B to a plurality of other service dependency work graph nodes 712 and a plurality of other service object data 710. In some embodiments, the additional information represented by the plurality of other service dependency work graph nodes 712 and/or the plurality of other service object data 710 may be represented in accordance with any other embodiments of a service dependency work graph structure, service list, graphical user interface, the like, or combinations thereof as described herein with respect to FIGS. 1-8.

Referring now to FIG. 8, an example service dependency work graph structure 800 will be described with respect to data residency requirements for services A-F, represented by service dependency work graph nodes 802A-F. Service dependency work graph node 802A is illustrated to represent service A which may be associated with a data residency requirement. By way of non-limiting example, service A may be an application that monitors health related information for citizens of Italy and, as such, service A must conform to one or more data residency requirements imposed by the laws of the Italian Government and/or the Europe Union. Accordingly, the developer of service A must be able to ensure that all services depended on by service A also conform to data residency requirements applicable to service A.

The example service dependency work graph structure 800 illustrates dependencies identified in relation to service A, as represented by service dependency work graph node 802A. Example service dependency work graph structure 800 may be represented in response to a service dependency discovery request transmitted via a computing device to discover all service dependencies associated with service A. Additionally, the service dependency work graph structure 800 may be configured to identify non-compliant services that do not conform to one or more requirements set for service A (e.g., data residency requirement, data type requirement, etc.). In some embodiments, a non-compliant service may be identified by way of one or more detection programs (e.g., third party resource detection, etc.) and in response be represented by a service object associated with a non-compliant service object identifier further associated with a particular conflict type (e.g., service dependency data residency type conflict, service dependency data type conflict, the like or combinations thereof).

As shown, by service dependency work graph structure 800, service A, as represented by service dependency work graph node 802A, exhibits a service dependency data residency type conflict (as illustrated, for example, by conflict icon 810) associated with the service dependency object comprising service dependency work graph nodes 802A-B. The service dependency data residency type conflict may be identified, for example, because service A can only be communicably supported by services within region A (not shown) (e.g., Europe, Schengen Area Countries, etc.) in order to conform to a data residency requirement applied to service A. The developer of service A, based on the service object data represented via service dependency work graph structure 800, may choose to take corrective actions and block service A from accessing service B. In some embodiments, a client (e.g., a customer of a service application) may define a data residency requirement and/or a data residence for existing data, for example, in the European Union and/or the United States. In some embodiments, the data residency for a particular service may be determined based on a hosting URL. For example, service C may be hosted at 'Host-servicec.prod.eu-east.company.com' and service B may be hosted at 'Host-servicec.prod.us-west-.company.com' and the residency region for service C and service B may be detected as 'eu-east' and 'us-west' respectively.

In some embodiments, service B may be identified as a replaceable service such that service dependency work graph structure 800 may identify one or more replacement services. Service dependency work graph structure 800 may identify one or more replacement services by way of one or more of a service object, service object data, service dependency object, the like, or combinations thereof. As further illustrated by FIG. 8, the replacement service for service B is service C, represented by service dependency work graph node 802C, which is not in conflict with the data residency requirement applied to service A. Service C is further shown to be dependent on service E. As shown, service E is in conflict (as illustrated, for example, by conflict icon 812) with the data residency requirement applied to service A indirectly through service C. Additionally, while service E, represented by service dependency work graph node 802E, is shown to conform to the data residency requirements applied to service A (e.g., service E is associated with a computing device in region A), by way of a representative geolocation identifying data object, service is identified as a non-compliant service because, for example, service E is dependence on service F associated with a region other than region A (e.g., region F). Due to service E being dependent on service F, associated with region F, the developer of service A, based on the service object data represented via service dependency work graph structure 800, may further choose to take corrective actions and block service A from accessing the functionality of service E that requires access to service E. Additionally or alternatively, service C may be configured to replace service E with replacement service D.

In some embodiments, the corrective actions attributed to the developer of service A may be dynamically performed at least partially by one or more software or hardware components as described herein with respect to apparatus 200, 300, the like or combinations thereof. Moreover, any input signals (e.g., input signal 512, 612, 712, etc.) described with respect to any example service dependency work graph structure may be dynamically performed at least partially by one or more software or hardware components as described herein with respect to apparatus 200, 300, the like or combinations thereof. Further, any example service dependency work graph structure described may be configured with filters such that one or more of a service object (e.g., non-compliant service object, etc.), service dependency work graph node, service dependency data residency type conflict, the like or combinations thereof may be suppressed with respect to a visual representation rendered via a graphical user interface.

FIG. 9 is a flowchart diagram of an example process 900, for generating a service dependency work graph structure based on one or more service objects, each representing a respective service, in accordance with a service dependency system 105. Via the various operations of process 900, the service dependency server 106, or the like, of the service dependency system 105 can enhance efficiency and effectiveness of traditional dependency deployment architectures and better conform to service guarantees by dynamically determining any pertinent service dependency relationships.

The process 900 begins at operation 902 when the service dependency server 106 retrieves one or more service objects from a service object repository, wherein each service object is associated with a service object identifier and service object data comprising one or more service dependency objects, and wherein each of the one or more service dependency objects is associated with one or more of a unique service dependency object identifier, a service dependency interface type, a service dependency data type, or a service dependency data residency type.

At operation 904, the service dependency server 106, for each service object, extracts from each of its one or more service dependency objects any nested service dependency objects, wherein a nested service dependency object is associated with one or more of a unique nested service dependency object identifier, a respective service object identifier associated with the service object, a respective service dependency interface type associated with the service object, a respective service dependency data type associated with the service object, or a respective service dependency data residency type associated with the service object.

At operation 906, the service dependency server 106 identifies, based at least in part on the service object data, a service object relationship between each service object of the one or more service objects and every other service object of the one or more service objects.

At operation 908, the service dependency server 106 generates, based at least in part on the service object relationship identified between each of the one or more service objects, a service dependency work graph structure interrelating the one or more service objects.

FIG. 10 is a flowchart diagram of an example process 1000, for generating one or more service object criticality scores for a service object based on a service dependency work graph structure, in accordance with a service dependency system 105. Via the various operations of process 1000, the service dependency server 106, or the like, of the service dependency system 105 can enhance efficiency and effectiveness of traditional dependency deployment architectures and better conform to service guarantees by dynamically determining any pertinent service dependency relationships.

At operation 1002, the service dependency server 106 retrieves a service dependency work graph structure from a service object repository, wherein the service dependency work graph structure comprises a plurality of service dependency work graph nodes connected by a plurality of service dependency work graph edges, wherein each service dependency work graph node is associated with a unique service object identifier of a plurality of service object identifiers.

At operation 1004, the service dependency server 106, for each unique service object identifier, traverses the service dependency work graph structure.

At operation 1006, the service dependency server 106, for each unique service object identifier, based at least in part on a strength measure associated with each service object relationship of one or more service object relationships associated with the unique service object identifier, generates the one or more service object criticality scores for the unique service object identifier in relation to each other service object identifier of the plurality of service object identifiers.

FIG. 11 is a flowchart diagram of an example process 1100, for identifying limited service object identifiers based on a service dependency work graph structure and a service guarantee, in accordance with a service dependency system 105. Via the various operations of process 1100, the service dependency server 106, or the like, of the service dependency system 105 can enhance efficiency and effectiveness of traditional dependency deployment architectures and better conform to service guarantees by dynamically determining any pertinent service dependency relationships.

At operation 1102, the service dependency server 106 retrieves, from a service object repository, one or more service object identifiers associated with a resource detection.

At operation 1104, the service dependency server 106, for each service object identifier of the one or more service object identifiers, traverses a service dependency work graph structure.

At operation 1106, the service dependency server 106, for each service object identifier of the one or more service object identifiers, based at least in part on a strength measure associated with each service object relationship of one or more service object relationships associated with the service object identifier, generates one or more service object reliability scores for the service object identifier in relation to each other service object identifier of the plurality of service object identifiers.

At operation 1108, the service dependency server 106 identifies those service object identifiers associated with service object reliability scores below a service guarantee threshold associated with the resource detection.

FIG. 12 is a flowchart diagram of an example process 1200, for identifying service dependency data type conflicts associated with service object identifiers based on a service dependency work graph structure and a service guarantee, in accordance with a service dependency system 105. Via the various operations of process 1200, the service dependency server 106, or the like, of the service dependency system 105 can enhance efficiency and effectiveness of traditional dependency deployment architectures and better conform to service guarantees by dynamically determining any pertinent service dependency relationships.

At operation 1202, the service dependency server 106 retrieves, from a service object repository, one or more service object identifiers associated with a resource detection.

At operation 1204, the service dependency server 106, for each service object identifier of the one or more service object identifiers, traverses a service dependency work graph structure.

At operation 1206, the service dependency server 106, for each service object identifier of the one or more service object identifiers, based at least in part on one or more service dependency data types associated with each service object relationship of one or more service object relationships associated with the service object identifier, generates one or more service object data scores for the service object identifier in relation to each other service object identifier of the plurality of service object identifiers At operation 1208, the service dependency server 106, identifies those service object identifiers associated with service object data scores below a service guarantee threshold associated with the resource detection.

FIG. 13 is a flowchart diagram of an example process 1300, for identifying service dependency data residency type conflicts associated with service object identifiers based on a service dependency work graph structure and a service guarantee, in accordance with a service dependency system 105. Via the various operations of process 1300, the service dependency server 106, or the like, of the service dependency system 105 can enhance efficiency and effectiveness of traditional dependency deployment architectures and better conform to service guarantees by dynamically determining any pertinent service dependency relationships.

At operation 1302, the service dependency server 106 retrieves, from a service object repository, one or more service object identifiers associated with a resource detection.

At operation 1304, the service dependency server 106, for each service object identifier of the one or more service object identifiers, traverses a service dependency work graph structure At operation 1306, the service dependency server 106, for each service object identifier of the one or more service object identifiers, based at least in part on one or more service dependency data residency types associated with each service object relationship of one or more service object relationships associated with the service object identifier, identifies those service object identifiers associated with service dependency data residency types in conflict with a data residency requirement associated with the resource detection.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In some embodiments, an apparatus for generating service dependency work graph structures based on service objects, the apparatus including at least one processor and at least one memory including program code that with the processor, cause the apparatus to retrieve one or more service objects from a service object repository. In some of these embodiments, each service object is associated with a service object identifier and service object data including one or more service dependency objects. In some of these embodiments, each of the one or more service dependency objects is associated with one or more of a unique service dependency object identifier, a service dependency interface type, a service dependency data type, or a service dependency data residency type. In some of these embodiments, the apparatus is further caused to, for each service object, extract from each of its one or more service dependency objects any nested service dependency objects. In some of these embodiments, a nested service dependency object is associated with one or more of a unique nested service dependency object identifier, a respective service object identifier associated with the service object, a respective service dependency interface type associated with the service object, a respective service dependency data type associated with the service object, or a respective service dependency data residency type associated with the service object. In some of these embodiments, the apparatus is further caused to identify, based at least in part on the service object data, a service object relationship between each service object of the one or more service objects and every other service object of the one or more service objects. In some of these embodiments, the apparatus is further caused to generate, based at least in part on the service object relationship identified between each of the one or more service objects, a service dependency work graph structure interrelating the one or more service objects.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges.

In some of these embodiments, the service dependency work graph node represents a service object of the one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the service dependency interface type includes an application programming interface (API) call, an event, a notification, a protocol, or a syntax.

In some of these embodiments, the service dependency interface type is representative of how data may be exchanged between the one or more service objects.

In some of these embodiments, the service dependency data residency type includes an internet protocol (IP) address, an IP geolocation database object, a service provider country or region code, a JavaScript Object Notation (JSON) object, an internet country code, Domain Name System (DNS) lookup data, Amazon Web Services (AWS) region data, or global positioning system coordinate data.

In some of these embodiments, the service dependency data type includes one or more of a Domain Name System (DNS) lookup type, a tracing type, an access log type, a messaging type, or a manual type.

In some of these embodiments, a service object of the one or more service objects is associated with a service object reliability level determined based on one or more of message persistence, message acknowledgements, message resend attempts, duplicate message eliminations, priority message delivery order, sender delivery status, or receiver delivery status.

In some of these embodiments, the at least one memory including program code that with the processor, further causes the apparatus to iteratively unroll a nested service dependency structure to identify at least each nested service dependency object.

In some of these embodiments, the at least one memory including program code that with the processor, further causes the apparatus to iteratively unroll a nested service dependency structure to identify at least each service object relationship between a respective nested service dependency object and another nested service dependency object within the nested service dependency structure.

In some of these embodiments, the at least one memory including program code that with the processor, further causes the apparatus to iteratively unroll a nested service dependency structure to identify at least each service object relationship between a respective nested service dependency object and another service dependency object external to the nested service dependency structure.

In some of these embodiments, a particular service object is associated with a third party resource detection including at least one third party Application Programming Interface (API).

In some of these embodiments, the at least one third party API includes an API identifier including a number, a universally unique identifier (UUID), a date, or a unique identification type.

In some of these embodiments, the at least one memory including program code that with the processor, further causes the apparatus to dynamically update the service dependency work graph structure, the dynamic update occurs periodically based on at least a predefined time limit, a change to the service dependency work graph structure, or a refresh command.

In some of these embodiments, the service object relationship has a strength measure indicative of a quality of service (QoS) metric.

In some embodiments, a non-transitory computer readable storage medium including instructions for generating service dependency work graph structures based on service objects, when executed by a processor, cause an apparatus including at least one processor and at least one memory to retrieve one or more service objects from a service object repository. In some of these embodiments, each service object is associated with a service object identifier and service object data including one or more service dependency objects. In some of these embodiments, each of the one or more service dependency objects is associated with one or more of a unique service dependency object identifier, a service dependency interface type, a service dependency data type, or a service dependency data residency type. In some of these embodiments, the instructions further cause, for each service object, the apparatus to extract from each of its one or more service dependency objects any nested service dependency objects. In some of these embodiments, a nested service dependency object is associated with one or more of a unique nested service dependency object identifier, a respective service object identifier associated with the service object, a respective service dependency interface type associated with the service object, a respective service dependency data type associated with the service object, or a respective service dependency data residency type associated with the service object. In some of these embodiments, the instructions further cause the apparatus to identify, based at least in part on the service object data, a service object relationship between each service object of the one or more service objects and every other service object of the one or more service objects. In some of these embodiments, the instructions further cause the apparatus to generate, based at least in part on the service object relationship identified between each of the one or more service objects, a service dependency work graph structure interrelating the one or more service objects.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph nodes of the multiple service dependency work graph nodes by way of at least a service dependency work graph edge of the multiple service dependency work graph edges.

In some of these embodiments, the service dependency work graph node represents a service object of the one or more service objects.

In some of these embodiments, the service dependency work graph edge represents the service object relationship associated with a first service dependency work graph node and a second service dependency work graph node.

In some of these embodiments, the service dependency interface type includes an application programming interface (API) call, an event, a notification, a protocol, or a syntax.

In some of these embodiments, the service dependency interface type is representative of how data may be exchanged between the one or more service objects.

In some of these embodiments, the service dependency data residency type includes an internet protocol (IP) address, an IP geolocation database object, a service provider country or region code, a JavaScript Object Notation (JSON) object, an internet country code, Domain Name System (DNS) lookup data, Amazon Web Services (AWS) region data, or global positioning system coordinate data.

In some of these embodiments, the service dependency data type includes one or more of a Domain Name System (DNS) lookup type, a tracing type, an access log type, a messaging type, or a manual type.

In some of these embodiments, a service object of the one or more service objects is associated with a service object reliability level determined based on at least message persistence, message acknowledgements, message resend attempts, duplicate message eliminations, priority message delivery order, sender delivery status, and receiver delivery status.

In some of these embodiments, the instructions when executed by the processor, further causes the apparatus including at least one processor and at least one memory to iteratively unroll a nested service dependency structure to identify at least each nested service dependency object.

In some of these embodiments, the instructions when executed by the processor, further causes the apparatus including at least one processor and at least one memory to iteratively unroll a nested service dependency structure to identify at least each service object relationship between a respective nested service dependency object and another nested service dependency object within the nested service dependency structure.

In some of these embodiments, the instructions when executed by the processor, further causes the apparatus including at least one processor and at least one memory to iteratively unroll a nested service dependency structure to identify at least each service object relationship between a respective nested service dependency object and another service dependency object external to the nested service dependency structure.

In some of these embodiments, a particular service object is associated with a third party resource detection including at least one third party Application Programming Interface (API).

In some of these embodiments, the at least one third party API includes an API identifier including a number, a universally unique identifier (UUID), a date, or a unique identification type.

In some of these embodiments, the instructions when executed by the processor, further causes the apparatus including at least one processor and at least one memory to: dynamically update the service dependency work graph structure, the dynamic update occurs periodically based on at least a predefined time limit, a change to the service dependency work graph structure, or a refresh command.

In some of these embodiments, the service object relationship has a strength measure indicative of a quality of service (QoS) metric.

In some embodiments, a computer implemented method for generating service dependency work graph structures based on service objects, including retrieving one or more service objects from a service object repository. In some of these embodiments, each service object is associated with a service object identifier and service object data including one or more service dependency objects. In some of these embodiments, each of the one or more service dependency objects is associated with one or more of a unique service dependency object identifier, a service dependency interface type, a service dependency data type, or a service dependency data residency type. In some of these embodiments, the computer implemented method further includes, for each service object, extracting from each of its one or more service dependency objects any nested service dependency objects. In some of these embodiments, a nested service dependency object is associated with one or more of a unique nested service dependency object identifier, a respective service object identifier associated with the service object, a respective service dependency interface type associated with the service object, a respective service dependency data type associated with the service object, or a respective service dependency data residency type associated with the service object. In some of these embodiments, the computer implemented method further includes identifying, based at least in part on the service object data, a service object relationship between each service object of the one or more service objects and every other service object of the one or more service objects. In some of these embodiments, the computer implemented method further includes generating, based at least in part on the service object relationship identified between each of the one or more service objects, a service dependency work graph structure interrelating the one or more service objects.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph nodes of the multiple service dependency work graph nodes by way of at least a service dependency work graph edge of the multiple service dependency work graph edges.

In some of these embodiments, the service dependency work graph node represents a service object of the one or more service objects.

In some of these embodiments, the service dependency work graph edge represents the service object relationship associated with a first service dependency work graph node and a second service dependency work graph node.

In some of these embodiments, the service dependency interface type includes an application programming interface (API) call, an event, a notification, a protocol, or a syntax.

In some of these embodiments, the service dependency interface type is representative of how data may be exchanged between the one or more service objects.

In some of these embodiments, the service dependency data residency type includes an internet protocol (IP) address, an IP geolocation database object, a service provider country or region code, a JavaScript Object Notation (JSON) object, a Hyper-Text Transfer Protocol (HTML) data object, an internet country code, Domain Name System (DNS) lookup data, Amazon Web Services (AWS) region data, or global positioning system coordinate data.

In some of these embodiments, the service dependency data type includes one or more of a Domain Name System (DNS) lookup type, a tracing type, an access log type, a messaging type, or a manual type.

In some of these embodiments, a service object of the one or more service objects is associated with a service object reliability level determined based on at least message persistence, message acknowledgements, message resend attempts, duplicate message eliminations, priority message delivery order, sender delivery status, and receiver delivery status.

In some of these embodiments, the computer implemented method further includes iteratively unrolling a nested service dependency structure to identify at least each nested service dependency object.

In some of these embodiments, the computer implemented method further includes iteratively unrolling a nested service dependency structure to identify at least each service object relationship between a respective nested service dependency object and another nested service dependency object within the nested service dependency structure.

In some of these embodiments, the computer implemented method further includes iteratively unrolling a nested service dependency structure to identify at least each service object relationship between a respective nested service dependency object and another service dependency object external to the nested service dependency structure.

In some of these embodiments, a particular service object is associated with a third party resource detection including at least one third party Application Programming Interface (API).

In some of these embodiments, the at least one third party API includes an API identifier including a number, a universally unique identifier (UUID), a date, or a unique identification type.

In some of these embodiments, the computer implemented method further includes dynamically updating the service dependency work graph structure, the dynamic update occurs periodically based on at least a predefined time limit, a change to the service dependency work graph structure, or a refresh command.

In some of these embodiments, the service object relationship has a strength measure indicative of a quality of service (QoS) metric.

In some embodiments, an apparatus for generating service object criticality scores for service objects based on service dependency work graph structures, the apparatus including at least one processor and at least one memory including program code that with the processor, cause the apparatus to retrieve a service dependency work graph structure from a service object repository. In some of these embodiments, the service dependency work graph structure includes multiple service dependency work graph nodes connected by multiple service dependency work graph edges. In some of these embodiments, each service dependency work graph node is associated with a unique service object identifier of multiple service object identifiers. In some of these embodiments, the apparatus is further caused to, for each unique service object identifier, traverse the service dependency work graph structure. In some of these embodiments, the apparatus is further caused to, based at least in part on a strength measure associated with each service object relationship of one or more service object relationships associated with the unique service object identifier, generate the one or more service object criticality scores for the unique service object identifier in relation to each other service object identifier of the multiple service object identifiers.

In some of these embodiments, the at least one memory including program code that with the processor, further causes the apparatus to generate a reliability score for a service represented by the service object based on reliability scores associated with at least a neighboring node or a service object relationship of the service object.

In some of these embodiments, the reliability score is based on historical reliability data.

In some of these embodiments, the historical reliability data is stored in a historical reliability database including service object historical data, service object relationship historical data, previous iterations of the service dependency work graph structure, or service outage logs.

In some of these embodiments, the service object criticality scores represent a reliance level for direct comparison between service objects of the one or more service objects which provide at least one similar service.

In some of these embodiments, the service objects including the service dependency work graph structure are interchangeable alternatives to at least one service dependency work graph node.

In some of these embodiments, the service object criticality score represents a level of dependency of a first service object in relation to a second service object.

In some of these embodiments, the level of dependency is based on at least an availability of alternative second service objects or a determination of whether the second service object supports a critical or a non-critical function provided by the first service object.

In some of these embodiments, the service dependency work graph edge represents the service object relationship associated with a first service dependency work graph node and a second service dependency work graph node.

In some of these embodiments, the service object is associated with a service object identifier of the multiple service object identifiers and a service object data including one or more of a service dependency object.

In some of these embodiments, the service dependency object is associated with one or more of a unique service dependency object identifier, a service object identifier, a service dependency interface type, a service dependency data type, or a service dependency data residency type.

In some of these embodiments, the at least one memory including program code that with the processor, further causes the apparatus to generate a dependency data structure representing service dependencies for the service object based on associated criticality scores representative of a second service object.

In some of these embodiments, the at least one memory including program code that with the processor, further causes the apparatus to determine a ranking for each of multiple service objects based on a ranking criteria, the ranking criteria provides the ranking for each of the multiple service objects based on at least a respective service object criticality score.

In some embodiments, a non-transitory computer readable storage medium including instructions for generating service object criticality scores for service objects based on service dependency work graph structures, when executed by a processor, cause an apparatus including at least one processor and at least one memory to retrieve a service dependency work graph structure from a service object repository. In some of these embodiments, the service dependency work graph structure includes multiple service dependency work graph nodes connected by multiple service dependency work graph edges. In some of these embodiments, each service dependency work graph node is associated with a unique service object identifier of multiple service object identifiers. In some of these embodiments, the instructions when executed by the processor, further causes the apparatus including at least one processor and at least one memory to, for each unique service object identifier, traverse the service dependency work graph structure. In some of these embodiments, the instructions when executed by the processor, further causes the apparatus including at least one processor and at least one memory to, based at least in part on a strength measure associated with each service object relationship of one or more service object relationships associated with the unique service object identifier, generate the one or more service object criticality scores for the unique service object identifier in relation to each other service object identifier of the multiple service object identifiers.

In some of these embodiments, the instructions when executed by the processor, further causes the apparatus including at least one processor and at least one memory to generate a reliability score for a service represented by the service object based on reliability scores associated with at least a neighboring node or a service object relationship of the service object.

In some of these embodiments, the reliability score is based on historical reliability data.

In some of these embodiments, the historical reliability data is stored in a historical reliability database including service object historical data, service object relationship historical data, previous iterations of the service dependency work graph structure, or service outage logs.

In some of these embodiments, the service object criticality scores represent a reliance level for direct comparison between service objects of the one or more service objects which provide at least one similar service.

In some of these embodiments, the service objects including the service dependency work graph structure are interchangeable alternatives to at least one service dependency work graph node.

In some of these embodiments, the service object criticality score represents a level of dependency of a first service object in relation to a second service object.

In some of these embodiments, the level of dependency is based on at least an availability of alternative second service objects or a determination of whether the second service object supports a critical or a non-critical function provided by the first service object.

In some of these embodiments, the service dependency work graph edge represents the service object relationship associated with a first service dependency work graph node and a second service dependency work graph node.

In some of these embodiments, the service object is associated with a service object identifier of the multiple service object identifiers and a service object data including one or more of a service dependency object.

In some of these embodiments, the service dependency object is associated with one or more of a unique service dependency object identifier, a service object identifier, a service dependency interface type, a service dependency data type, or a service dependency data residency type.

In some of these embodiments, the instructions when executed by the processor, further causes the apparatus including at least one processor and at least one memory to generate a dependency data structure representing service dependencies for the service object based on associated criticality scores representative of one or more of a second service object.

In some of these embodiments, the instructions when executed by the processor, further causes the apparatus including at least one processor and at least one memory to determine a ranking for each of multiple service objects based on a ranking service, the ranking service provides the ranking for each of the multiple service objects based on at least a respective service object criticality score.

In some embodiments, a computer implemented method for generating service object criticality scores for service objects based on service dependency work graph structures, including retrieving a service dependency work graph structure from a service object repository. In some of these embodiments, the service dependency work graph structure includes multiple service dependency work graph nodes connected by multiple service dependency work graph edges. In some of these embodiments, each service dependency work graph node is associated with a unique service object identifier of multiple service object identifiers. In some of these embodiments, the computer implemented method further includes, for each unique service object identifier, traversing the service dependency work graph structure. In some of these embodiments, the computer implemented method further includes, based at least in part on a strength measure associated with each service object relationship of one or more service object relationships associated with the unique service object identifier, generating the one or more service object criticality scores for the unique service object identifier in relation to each other service object identifier of the multiple service object identifiers.

In some of these embodiments, the computer implemented method further includes generating a reliability score for a service represented by the service object based on reliability scores associated with at least a neighboring node or a service object relationship of the service object.

In some of these embodiments, the reliability score is based on historical reliability data.

In some of these embodiments, the historical reliability data is stored in a historical reliability database including service object historical data, service object relationship historical data, previous iterations of the service dependency work graph structure, or service outage logs.

In some of these embodiments, the service object criticality scores represent a reliance level for direct comparison between service objects of the one or more service objects which provide at least one similar service.

In some of these embodiments, the service objects including the service dependency work graph structure are interchangeable alternatives to at least one service dependency work graph node.

In some of these embodiments, the service object criticality score represents a level of dependency of a first service object in relation to a second service object.

In some of these embodiments, the level of dependency is based on at least an availability of alternative second service objects or a determination of whether the second service object supports a critical or a non-critical function provided by the first service object.

In some of these embodiments, the service dependency work graph edge represents the service object relationship associated with a first service dependency work graph node and a second service dependency work graph node.

In some of these embodiments, the service object is associated with a service object identifier of the multiple service object identifiers and a service object data including one or more of a service dependency object.

In some of these embodiments, the service dependency object is associated with one or more of a unique service dependency object identifier, a service object identifier, a service dependency interface type, a service dependency data type, or a service dependency data residency type.

In some of these embodiments, the computer implemented method further includes generating a dependency data structure representing service dependencies for the service object based on associated criticality scores representative of one or more of a second service object.

In some of these embodiments, the computer implemented method further includes determining a ranking for each of multiple service objects based on a ranking service, the ranking service provides the ranking for each of the multiple service objects based on at least a respective service object criticality score.

In some embodiments, an apparatus for identifying limited service object identifiers based on service dependency work graph structures and service guarantees, the apparatus including at least one processor and at least one memory including program code that with the processor, cause the apparatus to retrieve, from a service object repository, one or more service object identifiers associated with a resource detection. In some of these embodiments, the apparatus is further caused to, for each service object identifier of the one or more service object identifiers, traverse a service dependency work graph structure. In some of these embodiments, the apparatus is further caused to, based at least in part on a strength measure associated with each service object relationship of one or more service object relationships associated with the service object identifier, generate one or more service object reliability scores for the service object identifier in relation to each other service object identifier of the multiple service object identifiers. In some of these embodiments, the apparatus is further caused to, identify those service object identifiers associated with service object reliability scores below a service guarantee threshold associated with the resource detection.

In some of these embodiments, the at least one memory including program code that with the processor, further causes the apparatus to generate, for the resource detection and based on multiple service object reliability scores associated with the resource detection, an aggregated service object reliability score In some of these embodiments, the at least one memory including program code that with the processor, further causes the apparatus to generate a respective rank for each service object identifier of the one or more service object identifiers based at least on respective service object reliability scores for each service object identifier. In some of these embodiments, the at least one memory including program code that with the processor, further causes the apparatus to generate a service object data structure including at least one of the one or more service object identifiers ordered according to at least the respective rank associated with at least one of the one or more service object identifiers.

In some of these embodiments, the at least one memory including program code that with the processor, further causes the apparatus to render a first interface displaying those service object identifiers associated with service object reliability scores below the service guarantee threshold.

In some of these embodiments, the service guarantee threshold is determined based at least on a predefined threshold value or a dynamically determined threshold value.

In some of these embodiments, the dynamically determined threshold value is based at least on the aggregated service object reliability score of the one or more service object reliability scores.

In some of these embodiments, the dynamically determined threshold value is updated periodically based on at least a predefined time limit, a change to the service dependency work graph structure, or a refresh command.

In some of these embodiments, the at least one memory including program code that with the processor, further causes the apparatus to render a second interface displaying those service object identifiers associated with service object reliability scores equivalent to or exceeding the service guarantee threshold. In some of these embodiments, the second interface is configured to be displayed separately from or in combination with the first interface based on an interface selection.

In some of these embodiments, the at least one memory including program code that with the processor, further causes the apparatus to remove, from the service object data structure, a non-compliant service object identifier. In some of these embodiments, the at least one memory including program code that with the processor, further causes the apparatus to re-calculate the aggregated service object reliability score. In some of these embodiments, the at least one memory including program code that with the processor, further causes the apparatus to evaluate the re-calculated aggregated service object reliability score against the service guarantee.

In some of these embodiments, the non-compliant service object identifier is associated with a respective service object reliability score below the service guarantee threshold.

In some of these embodiments, the updated aggregated service object reliability score is associated with another respective service object reliability score equivalent to or exceeding the service guarantee threshold.

In some of these embodiments, the at least one memory including program code that with the processor, further causes the apparatus to identify, from a service object reliability score list equivalent to or exceeding the service guarantee threshold, a first service object set with service object reliability scores equivalent to the service guarantee threshold that are replaceable by a second service object set with service object reliability scores exceeding the service guarantee threshold. In some of these embodiments, the at least one memory including program code that with the processor, further causes the apparatus to replace the first service object set with the second service object set such that the aggregated service object reliability score increases.

In some of these embodiments, the second service object set includes one or more internal service objects.

In some of these embodiments, the at least one memory including program code that with the processor, further causes the apparatus to identify a replaceable service object. determine one or more service object criticality scores for the replaceable service object. In some of these embodiments, the at least one memory including program code that with the processor, further causes the apparatus to identify one or more replacement service objects for the replaceable service object. In some of these embodiments, the at least one memory including program code that with the processor, further causes the apparatus to determine one or more service object criticality scores for the one or more replacement service objects.

In some embodiments, a non-transitory computer readable storage medium including instructions for identifying limited service object identifiers based on service dependency work graph structures and service guarantees, when executed by a processor, cause an apparatus including at least one processor and at least one memory to retrieve, from a service object repository, one or more service object identifiers associated with a resource detection. In some of these embodiments, the instructions when executed by a processor, further cause the apparatus to, for each service object identifier of the one or more service object identifiers, traverse a service dependency work graph structure. In some of these embodiments, the instructions when executed by a processor, further cause the apparatus to, based at least in part on a strength measure associated with each service object relationship of one or more service object relationships associated with the service object identifier, generate one or more service object reliability scores for the service object identifier in relation to each other service object identifier of the multiple service object identifiers. In some of these embodiments, the instructions when executed by a processor, further cause the apparatus to identify those service object identifiers associated with service object reliability scores below a service guarantee threshold associated with the resource detection.

In some of these embodiments, the instructions when executed by the processor, further causes the apparatus including at least one processor and at least one memory to generate, for the resource detection and based on multiple service object reliability scores associated with the resource detection, an aggregated service object reliability score.

In some of these embodiments, the instructions when executed by the processor, further causes the apparatus including at least one processor and at least one memory to generate a respective rank for each service object identifier of the one or more service object identifiers based at least on respective service object reliability scores for each service object identifier. In some of these embodiments, the instructions when executed by the processor, further causes the apparatus including at least one processor and at least one memory to generate a service object data structure including at least one of the one or more service object identifiers ordered according to at least the respective rank associated with at least one of the one or more service object identifiers.

In some of these embodiments, the instructions when executed by the processor, further causes the apparatus including at least one processor and at least one memory to render a first interface displaying those service object identifiers associated with service object reliability scores below the service guarantee threshold.

In some of these embodiments, the service guarantee threshold is determined based at least on a predefined threshold value or a dynamically determined threshold value.

In some of these embodiments, the dynamically determined threshold value is based at least on the aggregated service object reliability score of the one or more service object reliability scores.

In some of these embodiments, the dynamically determined threshold value is updated periodically based on at least a predefined time limit, a change to the service dependency work graph structure, or a refresh command.

In some of these embodiments, the instructions when executed by the processor, further causes the apparatus including at least one processor and at least one memory to render a second interface displaying those service object identifiers associated with service object reliability scores equivalent to or exceeding the service guarantee threshold, the second interface is configured to be displayed separately from or in combination with the first interface based on an interface selection.

In some of these embodiments, the instructions when executed by the processor, further causes the apparatus including at least one processor and at least one memory to remove, from the service object data structure, a non-compliant service object identifier. In some of these embodiments, the instructions when executed by the processor, further causes the apparatus including at least one processor and at least one memory to re-calculate the aggregated service object reliability score. In some of these embodiments, the instructions when executed by the processor, further causes the apparatus including at least one processor and at least one memory to evaluate the re-calculated aggregated service object reliability score against the service guarantee.

In some of these embodiments, the non-compliant service object identifier is associated with a respective service object reliability score below the service guarantee threshold.

In some of these embodiments, the updated aggregated service object reliability score is associated with another respective service object reliability score equivalent to or exceeding the service guarantee threshold.

In some of these embodiments, the instructions when executed by the processor, further causes the apparatus including at least one processor and at least one memory to identify a first service object set with service object reliability scores equivalent to the service guarantee threshold that are replaceable by a second service object set with service object reliability scores exceeding the service guarantee threshold. In some of these embodiments, the instructions when executed by the processor, further causes the apparatus including at least one processor and at least one memory to replace the first service object set with the second service object set such that the aggregated service object reliability score increases.

In some of these embodiments, the second service object set includes one or more internal service objects.

In some of these embodiments, the instructions when executed by the processor, further causes the apparatus including at least one processor and at least one memory to. In some of these embodiments, the instructions when executed by the processor, further causes the apparatus including at least one processor and at least one memory to identify a replaceable service object. In some of these embodiments, the instructions when executed by the processor, further causes the apparatus including at least one processor and at least one memory to determine one or more service object criticality scores for the replaceable service object. In some of these embodiments, the instructions when executed by the processor, further causes the apparatus including at least one processor and at least one memory to identify one or more replacement service objects for the replaceable service object. In some of these embodiments, the instructions when executed by the processor, further causes the apparatus including at least one processor and at least one memory to determine one or more service object criticality scores for the one or more replacement service objects.

In some embodiments, a computer implemented method for identifying limited service object identifiers based on service dependency work graph structures and service guarantees, including retrieving, from a service object repository, one or more service object identifiers associated with a resource detection. In some of these embodiments, the computer implemented method further includes, for each service object identifier of the one or more service object identifiers, traversing a service dependency work graph structure. In some of these embodiments, the computer implemented method further includes, based at least in part on a strength measure associated with each service object relationship of one or more service object relationships associated with the service object identifier, generating one or more service object reliability scores for the service object identifier in relation to each other service object identifier of the multiple service object identifiers. In some of these embodiments, the computer implemented method further includes, identifying those service object identifiers associated with service object reliability scores below a service guarantee threshold associated with the resource detection.

In some of these embodiments, the computer implemented method further includes generating, for the resource detection and based on multiple service object reliability scores associated with the resource detection, an aggregated service object reliability score.

In some of these embodiments, the computer implemented method further includes generating a respective rank for each service object identifier of the one or more service object identifiers based at least on respective service object reliability scores for each service object identifier. In some of these embodiments, the computer implemented method further includes generating a service object data structure including at least one of the one or more service object identifiers ordered according to at least the respective rank associated with at least one of the one or more service object identifiers.

In some of these embodiments, the computer implemented method further includes rendering a first interface displaying those service object identifiers associated with service object reliability scores below the service guarantee threshold.

In some of these embodiments, the service guarantee threshold is determined based at least on a predefined threshold value or a dynamically determined threshold value.

In some of these embodiments, the dynamically determined threshold value is based at least on the aggregated service object reliability score of the one or more service object reliability scores.

In some of these embodiments, the dynamically determined threshold value is updated periodically based on at least a predefined time limit, a change to the service dependency work graph structure, or a refresh command.

In some of these embodiments, the computer implemented method further includes rendering a second interface displaying those service object identifiers associated with service object reliability scores equivalent to or exceeding the service guarantee threshold, the second interface is configured to be displayed separately from or in combination with the first interface based on an interface selection.

In some of these embodiments, the computer implemented method further includes removing, from the service object data structure, a non-compliant service object identifier. In some of these embodiments, the computer implemented method further includes re-calculating the aggregated service object reliability score. In some of these embodiments, the computer implemented method further includes evaluating the re-calculated aggregated service object reliability score against the service guarantee.

In some of these embodiments, the non-compliant service object identifier is associated with a respective service object reliability score below the service guarantee threshold.

In some of these embodiments, the updated aggregated service object reliability score is associated with another respective service object reliability score equivalent to or exceeding the service guarantee threshold.

In some of these embodiments, the computer implemented method further includes identifying, from a service object reliability score list equivalent to or exceeding the service guarantee threshold, a first service object set with service object reliability scores equivalent to the service guarantee threshold that are replaceable by a second service object set with service object reliability scores exceeding above the service guarantee threshold. In some of these embodiments, the computer implemented method further includes replacing the first service object set with the second service object set such that the aggregated service object reliability score increases In some of these embodiments, the second service object set includes one or more internal service objects.

In some of these embodiments, the computer implemented method further includes identifying a replaceable service object. In some of these embodiments, the computer implemented method further includes determining one or more service object criticality scores for the replaceable service object. In some of these embodiments, the computer implemented method further includes identifying one or more replacement service objects for the replaceable service object. In some of these embodiments, the computer implemented method further includes determining one or more service object criticality scores for the one or more replacement service objects.

In some embodiments, an apparatus for identifying service dependency data type conflicts associated with service object identifiers based on service dependency work graph structures and service guarantees, the apparatus including at least one processor and at least one memory including program code that with the processor, cause the apparatus to retrieve, from a service object repository, one or more service object identifiers associated with a resource detection. In some of these embodiments, the apparatus is further caused to, for each service object identifier of the one or more service object identifiers, traverse a service dependency work graph structure. In some of these embodiments, the apparatus is further caused to, based at least in part on one or more service dependency data types associated with each service object relationship of one or more service object relationships associated with the service object identifier, generate one or more service object data scores for the service object identifier in relation to each other service object identifier of the multiple service object identifiers. In some of these embodiments, the apparatus is further caused to, identify those service object identifiers associated with service object data scores below a service guarantee threshold associated with the resource detection.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges.

In some of these embodiments, the service dependency work graph node represents a service object of one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the at least one memory including program code that with the processor, further causes the apparatus to render an interface displaying those service object identifiers associated with service object data scores below the service guarantee threshold associated with the resource detection.

In some of these embodiments, the at least one memory including program code that with the processor, further causes the apparatus to remove, from the service dependency work graph structure, one or more service objects associated with those service object identifiers associated with service object data scores below the service guarantee threshold associated with the resource detection.

In some embodiments, a non-transitory computer readable storage medium including instructions for identifying service dependency data type conflicts associated with service object identifiers based on service dependency work graph structures and service guarantees, when executed by a processor, cause an apparatus including at least one processor and at least one memory to retrieve, from a service object repository, one or more service object identifiers associated with a resource detection. In some of these embodiments, the instructions when executed by the processor further cause the apparatus to, for each service object identifier of the one or more service object identifiers, traverse a service dependency work graph structure. In some of these embodiments, the instructions when executed by the processor further cause the apparatus to, based at least in part on one or more service dependency data types associated with each service object relationship of one or more service object relationships associated with the service object identifier, generate one or more service object data scores for the service object identifier in relation to each other service object identifier of the multiple service object identifiers. In some of these embodiments, the instructions when executed by the processor further cause the apparatus to, identify those service object identifiers associated with service object data scores below a service guarantee threshold associated with the resource detection.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges In some of these embodiments, the service dependency work graph node represents a service object of one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the instructions when executed by the processor, further causes the apparatus including at least one processor and at least one memory to render an interface displaying those service object identifiers associated with service object data scores below the service guarantee threshold associated with the resource detection.

In some of these embodiments, the instructions when executed by the processor, further causes the apparatus including at least one processor and at least one memory to remove, from the service dependency work graph structure, one or more service objects associated with those service object identifiers associated with service object data scores below the service guarantee threshold associated with the resource detection.

In some embodiments, a computer implemented method for identifying service dependency data type conflicts associated with service object identifiers based on service dependency work graph structures and service guarantees, including retrieving, from a service object repository, one or more service object identifiers associated with a resource detection. In some of these embodiments, the computer implemented method further includes, for each service object identifier of the one or more service object identifiers, traversing a service dependency work graph structure. In some of these embodiments, the computer implemented method further includes, based at least in part on one or more service dependency data types associated with each service object relationship of one or more service object relationships associated with the service object identifier, generating one or more service object data scores for the service object identifier in relation to each other service object identifier of the multiple service object identifiers. In some of these embodiments, the computer implemented method further includes, identifying those service object identifiers associated with service object data scores below a service guarantee threshold associated with the resource detection.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges.

In some of these embodiments, the service dependency work graph node represents a service object of one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the computer implemented method further includes rendering an interface displaying those service object identifiers associated with service object data scores below the service guarantee threshold associated with the resource detection.

In some of these embodiments, the computer implemented method further includes removing, from the service dependency work graph structure, one or more service objects associated with those service object identifiers associated with service object data scores below the service guarantee threshold associated with the resource detection.

In some embodiments, an apparatus for identifying service dependency data residency type conflicts associated with service object identifiers based on service dependency work graph structures and service guarantees, the apparatus including at least one processor and at least one memory including program code that with the processor, cause the apparatus to retrieve, from a service object repository, one or more service object identifiers associated with a resource detection. In some of these embodiments, the apparatus is further caused to, for each service object identifier of the one or more service object identifiers, traverse a service dependency work graph structure. In some of these embodiments, the apparatus is further caused to, based at least in part on one or more service dependency data residency types associated with each service object relationship of one or more service object relationships associated with the service object identifier, identify those service object identifiers associated with service dependency data residency types in conflict with a data residency requirement associated with the resource detection.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges.

In some of these embodiments, the service dependency work graph node represents a service object of one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the at least one memory including program code that with the processor, further causes the apparatus to render an interface displaying those service object identifiers associated with the service dependency data residency types in conflict with the data residency requirement associated with the resource detection.

In some of these embodiments, the at least one memory including program code that with the processor, further causes the apparatus to remove, from the service dependency work graph structure, one or more service objects associated with those service object identifiers associated with the service dependency data residency types in conflict with the data residency requirement associated with the resource detection.

In some embodiments, a non-transitory computer readable storage medium including instructions for identifying service dependency data residency type conflicts associated with service object identifiers based on service dependency work graph structures and service guarantees, when executed by a processor, cause an apparatus including at least one processor and at least one memory to retrieve, from a service object repository, one or more service object identifiers associated with a resource detection. In some of these embodiments, the instructions when executed by the process further cause the apparatus to, for each service object identifier of the one or more service object identifiers, traverse a service dependency work graph structure. In some of these embodiments, the instructions when executed by the process further cause the apparatus to, based at least in part on one or more service dependency data residency types associated with each service object relationship of one or more service object relationships associated with the service object identifier, identify those service object identifiers associated with service dependency data residency types in conflict with a data residency requirement associated with the resource detection.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges.

In some of these embodiments, the service dependency work graph node represents a service object of one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the instructions when executed by the processor, further causes the apparatus including at least one processor and at least one memory to render an interface displaying those service object identifiers associated with the service dependency data residency types in conflict with the data residency requirement associated with the resource detection.

In some of these embodiments, the instructions when executed by the processor, further causes the apparatus including at least one processor and at least one memory to remove, from the service dependency work graph structure, one or more service objects associated with those service object identifiers associated with the service dependency data residency types in conflict with the data residency requirement associated with the resource detection.

In some embodiments, a computer implemented method for identifying service dependency data residency type conflicts associated with service object identifiers based on service dependency work graph structures and service guarantees, including retrieving, from a service object repository, one or more service object identifiers associated with a resource detection. In some of these embodiments, the computer implemented method further includes, for each service object identifier of the one or more service object identifiers, traversing a service dependency work graph structure. In some of these embodiments, the computer implemented method further includes, based at least in part on one or more service dependency data residency types associated with each service object relationship of one or more service object relationships associated with the service object identifier, identifying those service object identifiers associated with service dependency data residency types in conflict with a data residency requirement associated with the resource detection.

In some of these embodiments, the service dependency work graph structure includes multiple service dependency work graph nodes and multiple service dependency work graph edges.

In some of these embodiments, a service dependency work graph node of the multiple service dependency work graph nodes is connected to at least another service dependency work graph node of the multiple service dependency work graph nodes by way of at least a service dependency work graph edge of the multiple service dependency work graph edges.

In some of these embodiments, the service dependency work graph node represents a service object of one or more service objects, the one or more service dependency objects are directly or transitively dependent on at least one or more other service objects to process one or more functional services.

In some of these embodiments, the service dependency work graph edge represents the service object relationship associated with a first service dependency work graph node and a second service dependency work graph node.

In some of these embodiments, the computer implemented method further includes rendering an interface displaying those service object identifiers associated with service dependency data residency types in conflict with a data residency requirement associated with the resource detection.

In some of these embodiments, the computer implemented method further includes removing, from the service dependency work graph structure, one or more service objects associated with those service object identifiers associated with service dependency data residency types in conflict with a data residency requirement associated with the resource detection.

In some of these embodiments, the data residency requirement is associated with a restriction placed on data transferred to, generated by, accessed by, or stored in a particular geographic location.

In some of these embodiments, the data residency requirement restricts particular data from being transmitted from a first computing device in a first geographic region to a second computing device in a second geographic region.

In some of these embodiments, the particular geographic region is one or more of United States, Germany, Canada, Europe, Japan, or China.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for generating one or more service object criticality scores for service objects based on service dependency work graph structures, the apparatus comprising at least one processor and at least one memory including program code that with the processor, cause the apparatus to:

retrieve a service dependency work graph structure from a service object repository, wherein the service dependency work graph structure comprises a plurality of service dependency work graph nodes connected by a plurality of service dependency work graph edges, wherein each service dependency work graph node is associated with a unique service object identifier of a plurality of service object identifiers; and for each unique service object identifier,
traverse the service dependency work graph structure; and
based at least in part on a strength measure associated with each service object relationship of one or more service object relationships associated with the unique service object identifier, generate the one or more service object criticality scores for the unique service object identifier in relation to each other service object identifier of the plurality of service object identifiers.

2. The apparatus according to claim 1, wherein the at least one memory including program code that with the processor, further causes the apparatus to:

generate a reliability score for a service represented by the service object based on reliability scores associated with at least a neighboring node or a service object relationship of the service object.

3. The apparatus according to claim 2, wherein the reliability score is based on historical reliability data.

4. The apparatus according to claim 3, wherein the historical reliability data is stored in a historical reliability database comprising service object historical data, service object relationship historical data, previous iterations of the service dependency work graph structure, or service outage logs.

5. The apparatus according to claim 1, wherein the service object criticality scores represent a reliance level for direct comparison between service objects which provide at least one similar service.

6. The apparatus according to claim 5, wherein the service objects comprising the service dependency work graph structure are interchangeable alternatives to at least one service dependency work graph node.

7. The apparatus according to claim 1, wherein the service object criticality score represents a level of dependency of a first service object in relation to a second service object.

8. The apparatus according to claim 7, wherein the level of dependency is based on at least an availability of alternative second service objects or a determination of whether the second service object supports a critical or a non-critical function provided by the first service object.

9. The apparatus according to claim 1, wherein the service dependency work graph edge represents the service object relationship associated with a first service dependency work graph node and a second service dependency work graph node.

10. The apparatus according to claim 1, wherein the service object is associated with a service object identifier of the plurality of service object identifiers and a service object data comprising one or more of a service dependency object.

11. The apparatus according to claim 10, wherein the service dependency object is associated with one or more of a unique service dependency object identifier, a service object identifier, a service dependency interface type, a service dependency data type, or a service dependency data residency type.

12. The apparatus according to claim 1, wherein the at least one memory including program code that with the processor, further causes the apparatus to:
generate a dependency data structure representing service dependencies for the service object based on associated criticality scores representative of a second service object.

13. The apparatus according to claim 1, wherein the at least one memory including program code that with the processor, further causes the apparatus to:
determine a ranking for each of a plurality of service objects based on a ranking criteria, wherein the ranking criteria provides the ranking for each of the plurality of service objects based on at least a respective service object criticality score.

14. A non-transitory computer readable storage medium comprising instructions for generating one or more service object criticality scores for service objects based on service dependency work graph structures, when executed by a processor, cause an apparatus comprising at least one processor and at least one memory to:
retrieve a service dependency work graph structure from a service object repository, wherein the service dependency work graph structure comprises a plurality of service dependency work graph nodes connected by a plurality of service dependency work graph edges, wherein each service dependency work graph node is associated with a unique service object identifier of a plurality of service object identifiers; and
for each unique service object identifier,
traverse the service dependency work graph structure; and
based at least in part on a strength measure associated with each service object relationship of one or more service object relationships associated with the unique service object identifier, generate the one or more service object criticality scores for the unique service object identifier in relation to each other service object identifier of the plurality of service object identifiers.

15. The non-transitory computer readable storage medium according to claim 14, when executed by the processor, further causes the apparatus comprising at least one processor and at least one memory to:
generate a reliability score for a service represented by the service object based on reliability scores associated with at least a neighboring node or a service object relationship of the service object.

16. The non-transitory computer readable storage medium according to claim 15, wherein the reliability score is based on historical reliability data.

17. The non-transitory computer readable storage medium according to claim 16, wherein the historical reliability data is stored in a historical reliability database comprising service object historical data, service object relationship historical data, previous iterations of the service dependency work graph structure, or service outage logs.

18. The non-transitory computer readable storage medium according to claim 14, wherein the service object criticality scores represent a reliance level for direct comparison between service objects which provide at least one similar service.

19. The non-transitory computer readable storage medium according to claim 18, wherein the service objects comprising the service dependency work graph structure are interchangeable alternatives to at least one service dependency work graph node.

20. A computer implemented method for generating one or more service object criticality scores for service objects based on service dependency work graph structures, comprising:
retrieving a service dependency work graph structure from a service object repository, wherein the service dependency work graph structure comprises a plurality of service dependency work graph nodes connected by a plurality of service dependency work graph edges, wherein each service dependency work graph node is associated with a unique service object identifier of a plurality of service object identifiers; and
for each unique service object identifier,
traversing the service dependency work graph structure; and
based at least in part on a strength measure associated with each service object relationship of one or more service object relationships associated with the unique service object identifier, generating the one or more service object criticality scores for the unique service object identifier in relation to each other service object identifier of the plurality of service object identifiers.

* * * * *